(12) United States Patent
Connor

(10) Patent No.: US 12,205,231 B2
(45) Date of Patent: Jan. 21, 2025

(54) HOLOVISIONS™—ADJUSTABLE AND/OR MODULAR AUGMENTED REALITY (AR) EYEWEAR WITH A MOVABLE TRANSFLECTIVE MIRROR AND DIFFERENT VIEWING MODES

(71) Applicant: Robert A. Connor, Wyoming, MN (US)

(72) Inventor: Robert A. Connor, Wyoming, MN (US)

(73) Assignee: Holovisions, Ham Lake, MN (US)

( * ) Notice: Subject to any disclaimer, the term of this patent is extended or adjusted under 35 U.S.C. 154(b) by 0 days.

(21) Appl. No.: 18/586,439

(22) Filed: Feb. 24, 2024

(65) Prior Publication Data
US 2024/0242450 A1 Jul. 18, 2024

Related U.S. Application Data

(63) Continuation-in-part of application No. 18/088,548, filed on Dec. 24, 2022, now Pat. No. 12,013,538, which is a continuation-in-part of application No. 17/722,354, filed on Apr. 17, 2022, now Pat. No. 11,754,843, which is a continuation-in-part of application No. 17/501,495, filed on Oct. 14, 2021, now Pat. No. 11,307,420, which is a continuation-in-part of application No. 16/686,170, filed on Nov. 17, 2019, now Pat. No. 11,163,163, which is a continuation-in-part of application No. 16/175,924, filed on Oct. 31, 2018, now Pat. No. 10,859,834, which is a continuation-in-part of
(Continued)

(51) Int. Cl.
*G06T 19/00* (2011.01)
*G02B 27/01* (2006.01)

(52) U.S. Cl.
CPC ........ *G06T 19/006* (2013.01); *G02B 27/0172* (2013.01)

(58) Field of Classification Search
CPC ........ G02B 27/0172; G02B 2027/0154; G02B 27/0176; G02B 2027/0118; G02B 2027/0159; G02B 2027/0178; G02B 26/0816; G06T 19/006
See application file for complete search history.

(56) References Cited

U.S. PATENT DOCUMENTS 10,215,698 B2 2/2019 Han et al.
10,690,986 B2 6/2020 Firka et al.
(Continued)

FOREIGN PATENT DOCUMENTS

CN 106526860 A * 3/2017
WO WO-2012102328 A1 * 8/2012 ......... G02B 27/0172

*Primary Examiner* — Collin X Beatty

(57) ABSTRACT

Disclosed herein is adjustable and/or modular augmented reality eyewear with a first viewing mode which optimizes a person's view of the real world and a second viewing mode which optimizes the person's view of virtual objects. The viewing mode is changed by moving a transflective mirror from a first location to a second location. The second location is closer to the center of the person's field of view than the first location. When the transflective mirror is in the person's field of view and reflects light from a display toward the person's eyes, then it displays a virtual object in the person's field of view.

2 Claims, 4 Drawing Sheets

Related U.S. Application Data application No. 15/942,498, filed on Mar. 31, 2018, now Pat. No. 10,338,400.

(60) Provisional application No. 63/212,054, filed on Jun. 17, 2021, provisional application No. 63/192,664, filed on May 25, 2021, provisional application No. 62/791,359, filed on Jan. 11, 2019, provisional application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/716,507, filed on Aug. 9, 2018, provisional application No. 62/714,684, filed on Aug. 4, 2018, provisional application No. 62/703,025, filed on Jul. 25, 2018, provisional application No. 62/699,800, filed on Jul. 18, 2018, provisional application No. 62/695,124, filed on Jul. 8, 2018, provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/572,328, filed on Oct. 13, 2017, provisional application No. 62/563,798, filed on Sep. 27, 2017, provisional application No. 62/561,834, filed on Sep. 22, 2017, provisional application No. 62/528,331, filed on Jul. 3, 2017.

(56) References Cited

U.S. PATENT DOCUMENTS

| | | |
|---|---|---|
| 10,768,451 B1 | 9/2020 | Carlson |
| 10,962,783 B2 | 3/2021 | Wilson et al. |
| 11,086,143 B1 | 8/2021 | Gill et al. |
| 11,215,829 B2 | 1/2022 | Topliss et al. |
| 11,467,407 B2 | 10/2022 | DeLapp et al. |
| 11,885,968 B2 | 1/2024 | Hua et al. |
| 2013/0021658 A1 | 1/2013 | Miao et al. |
| 2013/0077175 A1 | 3/2013 | Hotta et al. |
| 2013/0314759 A1 | 11/2013 | Miao et al. |
| 2014/0003762 A1 | 1/2014 | Macnamara |
| 2014/0036361 A1 | 2/2014 | Woodgate et al. |
| 2015/0036223 A1 | 2/2015 | Dobschal et al. |
| 2016/0161740 A1 | 6/2016 | Bar-Zeev et al. |
| 2016/0178910 A1 | 6/2016 | Giudicelli et al. |
| 2016/0189432 A1 | 6/2016 | Bar-Zeev et al. |
| 2016/0335806 A1 | 11/2016 | Chan et al. |
| 2017/0139110 A1 | 5/2017 | Woodgate et al. |
| 2017/0285347 A1 | 10/2017 | Cai et al. |
| 2017/0299869 A1 | 10/2017 | Urey et al. |
| 2017/0299870 A1 | 10/2017 | Urey et al. |
| 2017/0345217 A1 | 11/2017 | Chan et al. |
| 2018/0003962 A1 | 1/2018 | Urey et al. |
| 2018/0003981 A1 | 1/2018 | Urey |
| 2018/0074248 A1 | 3/2018 | Shani et al. |
| 2018/0074318 A1 | 3/2018 | Wheelwright et al. |
| 2018/0074319 A1 | 3/2018 | Wheelwright et al. |
| 2018/0074320 A1 | 3/2018 | Wheelwright et al. |
| 2018/0074323 A1 | 3/2018 | Wheelwright et al. |
| 2018/0074324 A1 | 3/2018 | Wheelwright et al. |
| 2018/0074325 A1 | 3/2018 | Wheelwright et al. |
| 2018/0100959 A1 | 4/2018 | Vasylyev |
| 2018/0143427 A1 | 5/2018 | Griffin et al. |
| 2018/0164882 A1 | 6/2018 | Johnson et al. |
| 2018/0172995 A1 | 6/2018 | Lee et al. |
| 2018/0172999 A1 | 6/2018 | Sulai et al. |
| 2018/0182150 A1 | 6/2018 | Benishti et al. |
| 2018/0231784 A1 | 8/2018 | Koudsi et al. |
| 2018/0252917 A1 | 9/2018 | Takahashi et al. |
| 2018/0252918 A1 | 9/2018 | Takahashi et al. |
| 2018/0284441 A1 | 10/2018 | Cobb |
| 2018/0348524 A1 | 12/2018 | Blum et al. |
| 2019/0025602 A1 | 1/2019 | Qin et al. |
| 2019/0041232 A1 | 2/2019 | Maruyama et al. |
| 2019/0043238 A1 | 2/2019 | Benishti et al. |
| 2019/0090766 A1 | 3/2019 | Block et al. |
| 2019/0094537 A1 | 3/2019 | Choi et al. |
| 2019/0094550 A1 | 3/2019 | Takagi et al. |
| 2019/0101764 A1 | 4/2019 | Cakmakci |
| 2019/0101767 A1 | 4/2019 | Geng et al. |
| 2019/0107719 A1 | 4/2019 | Edwin et al. |
| 2019/0107723 A1 | 4/2019 | Lee et al. |
| 2019/0129213 A1 | 5/2019 | Cho et al. |
| 2019/0158810 A1 | 5/2019 | Cho et al. |
| 2019/0162950 A1 | 5/2019 | Lapstun |
| 2019/0165052 A1 | 5/2019 | Son et al. |
| 2019/0187472 A1 | 6/2019 | Choi et al. |
| 2019/0227305 A1 | 7/2019 | Fortin-Desch Nes et al. |
| 2019/0227315 A1 | 7/2019 | Sun et al. |
| 2019/0228586 A1 | 7/2019 | Bar-Zeev et al. |
| 2019/0235252 A1 | 8/2019 | Freedman et al. |
| 2019/0235281 A1 | 8/2019 | Etzkorn et al. |
| 2019/0265476 A1 | 8/2019 | Blum et al. |
| 2019/0265515 A1 | 8/2019 | Lee et al. |
| 2019/0273916 A1 | 9/2019 | Benishti et al. |
| 2019/0278092 A1 | 9/2019 | Kuo et al. |
| 2019/0282399 A1 | 9/2019 | Goetz |
| 2019/0285960 A1 | 9/2019 | Sasa et al. |
| 2019/0289284 A1 | 9/2019 | Smith et al. |
| 2019/0293938 A1 | 9/2019 | Le Saux et al. |
| 2019/0294019 A1 | 9/2019 | Park et al. |
| 2019/0294109 A1 | 9/2019 | Lee et al. |
| 2019/0331918 A1 | 10/2019 | Hong |
| 2019/0331923 A1 | 10/2019 | Cai et al. |
| 2019/0331924 A1 | 10/2019 | Cai et al. |
| 2019/0339528 A1 | 11/2019 | Freeman et al. |
| 2019/0348460 A1 | 11/2019 | Chen et al. |
| 2019/0352808 A1 | 11/2019 | Yoon et al. |
| 2019/0353906 A1 | 11/2019 | Gollier et al. |
| 2019/0361245 A1 | 11/2019 | Lanman et al. |
| 2019/0371065 A1 | 12/2019 | Anders et al. |
| 2019/0377182 A1 | 12/2019 | Sharp |
| 2019/0377183 A1 | 12/2019 | Sharp |
| 2019/0377184 A1 | 12/2019 | Sharp et al. |
| 2019/0377186 A1 | 12/2019 | Collins |
| 2019/0378338 A1 | 12/2019 | Bar-Zeev et al. |
| 2019/0378872 A1 | 12/2019 | Chen et al. |
| 2019/0385342 A1 | 12/2019 | Freeman et al. |
| 2019/0391396 A1 | 12/2019 | Saarikko |
| 2020/0012110 A1 | 1/2020 | Blum et al. |
| 2020/0026076 A1 | 1/2020 | Beckman |
| 2020/0033693 A1 | 1/2020 | Lu et al. |
| 2020/0041798 A1 | 2/2020 | Kress et al. |
| 2020/0064627 A1 | 2/2020 | Ouderkirk et al. |
| 2020/0081252 A1 | 3/2020 | Jamali et al. |
| 2020/0110268 A1 | 4/2020 | Robbins et al. |
| 2020/0117005 A1 | 4/2020 | Chi et al. |
| 2020/0124858 A1 | 4/2020 | Cakmakci |
| 2020/0132919 A1 | 4/2020 | Cakmakci |
| 2020/0142109 A1 | 5/2020 | Olkkonen et al. |
| 2020/0142202 A1 | 5/2020 | Lee et al. |
| 2020/0159026 A1 | 5/2020 | Waldern et al. |
| 2020/0166691 A1 | 5/2020 | Vartiainen et al. |
| 2020/0166756 A1 | 5/2020 | DeLapp et al. |
| 2020/0174255 A1 | 6/2020 | Hollands et al. |
| 2020/0192095 A1 | 6/2020 | Puetz et al. |
| 2020/0192152 A1 | 6/2020 | Jamali et al. |
| 2020/0209626 A1 | 7/2020 | Huang et al. |
| 2020/0225479 A1 | 7/2020 | Chi et al. |
| 2020/0249480 A1 | 8/2020 | Martinez et al. |
| 2020/0257065 A1 | 8/2020 | Chi et al. |
| 2020/0259307 A1 | 8/2020 | Sharma et al. |
| 2020/0271936 A1 | 8/2020 | Leibovici et al. |
| 2020/0271938 A1 | 8/2020 | Taylor et al. |
| 2020/0281457 A1 | 9/2020 | Zimanyi |
| 2020/0281458 A1 | 9/2020 | Zimanyi |
| 2020/0301151 A1 | 9/2020 | Freedman et al. |
| 2020/0301153 A1 | 9/2020 | Toleno et al. |
| 2020/0301239 A1 | 9/2020 | Akkaya et al. |
| 2020/0303151 A1 | 9/2020 | Du et al. |

(56) References Cited

U.S. PATENT DOCUMENTS

| | | |
|---|---|---|
| 2020/0333596 A1 | 10/2020 | Yoon et al. |
| 2020/0334907 A1 | 10/2020 | Bender et al. |
| 2020/0336731 A1 | 10/2020 | Welch et al. |
| 2020/0345293 A1 | 11/2020 | Ras et al. |
| 2020/0348514 A1 | 11/2020 | Chi et al. |
| 2020/0348518 A1 | 11/2020 | Georgiou et al. |
| 2020/0348522 A1 | 11/2020 | Xiao et al. |
| 2020/0355929 A1 | 11/2020 | Zhang et al. |
| 2020/0371280 A1 | 11/2020 | Geng et al. |
| 2020/0371362 A1 | 11/2020 | Xiao et al. |
| 2020/0371371 A1 | 11/2020 | Liang et al. |
| 2020/0371387 A1 | 11/2020 | Gollier et al. |
| 2020/0371388 A1 | 11/2020 | Geng et al. |
| 2020/0393736 A1 | 12/2020 | Hu |
| 2020/0393910 A1 | 12/2020 | Gribetz et al. |
| 2020/0396431 A1 | 12/2020 | Stafford |
| 2020/0400955 A1 | 12/2020 | Messer et al. |
| 2020/0408981 A1 | 12/2020 | Curtis et al. |
| 2021/0003848 A1 | 1/2021 | Choi et al. |
| 2021/0011290 A1 | 1/2021 | Maimone et al. |
| 2021/0018657 A1 | 1/2021 | Tsai et al. |
| 2021/0026138 A1 | 1/2021 | Alasaarela et al. |
| 2021/0033790 A1 | 2/2021 | Ward et al. |
| 2021/0041704 A1 | 2/2021 | Bhargava et al. |
| 2021/0051315 A1 | 2/2021 | Shamir et al. |
| 2021/0055466 A1 | 2/2021 | Eisenfeld |
| 2021/0055546 A1 | 2/2021 | Shin et al. |
| 2021/0055548 A1 | 2/2021 | Rao et al. |
| 2021/0055551 A1 | 2/2021 | Chi et al. |
| 2021/0055552 A1 | 2/2021 | Chi et al. |
| 2021/0055560 A1 | 2/2021 | Ben Tez et al. |
| 2021/0055561 A1 | 2/2021 | Danziger et al. |
| 2021/0055563 A1 | 2/2021 | Bouchier et al. |
| 2021/0055580 A1 | 2/2021 | Wells et al. |
| 2021/0063606 A1 | 3/2021 | Glik et al. |
| 2021/0063733 A1 | 3/2021 | Ronen |
| 2021/0063774 A1 | 3/2021 | Wang et al. |
| 2021/0065427 A1 | 3/2021 | Wade |
| 2021/0066402 A1 | 3/2021 | Pu et al. |
| 2021/0066574 A1 | 3/2021 | Diest et al. |
| 2021/0072437 A1 | 3/2021 | Singh et al. |
| 2021/0072453 A1 | 3/2021 | Peng et al. |
| 2021/0072541 A1 | 3/2021 | Kim et al. |
| 2021/0072559 A1 | 3/2021 | Wang et al. |
| 2021/0072585 A1 | 3/2021 | Shipton et al. |
| 2021/0072821 A1 | 3/2021 | Von Und Zu Liechtenstein |
| 2021/0074067 A1 | 3/2021 | Kwon et al. |
| 2021/0080635 A1 | 3/2021 | Menezes et al. |
| 2021/0080721 A1 | 3/2021 | Geng et al. |
| 2021/0080722 A1 | 3/2021 | Geng et al. |
| 2021/0080724 A1 | 3/2021 | Sulai et al. |
| 2021/0080725 A1 | 3/2021 | Sulai et al. |
| 2021/0080726 A1 | 3/2021 | Geng et al. |
| 2021/0080730 A1 | 3/2021 | Morrison et al. |
| 2021/0080739 A1 | 3/2021 | Geng et al. |
| 2021/0080763 A1 | 3/2021 | Sulai et al. |
| 2021/0080906 A1 | 3/2021 | Jolly et al. |
| 2021/0088700 A1 | 3/2021 | Wang et al. |
| 2021/0088794 A1 | 3/2021 | Melville |
| 2021/0088795 A1 | 3/2021 | Cheng et al. |
| 2021/0089129 A1 | 3/2021 | Osterhout et al. |
| 2021/0096380 A1 | 4/2021 | Osmanis et al. |
| 2021/0096391 A1 | 4/2021 | Ma et al. |
| 2021/0096453 A1 | 4/2021 | Wheelwright et al. |
| 2021/0103145 A1 | 4/2021 | You et al. |
| 2021/0103180 A1 | 4/2021 | Sears et al. |
| 2021/0103182 A1 | 4/2021 | Tan et al. |
| 2021/0109278 A1 | 4/2021 | Peroz et al. |
| 2021/0109352 A1 | 4/2021 | Lee et al. |
| 2021/0109433 A1 | 4/2021 | Trisnadi et al. |
| 2021/0112647 A1 | 4/2021 | Coleman |
| 2021/0191125 A1 | 6/2021 | Li et al. |
| 2021/0215938 A1 | 7/2021 | Maimone et al. |
| 2021/0240036 A1 | 8/2021 | Jamali et al. |
| 2021/0255490 A1 | 8/2021 | Parsons et al. |
| 2022/0006987 A1 | 1/2022 | Seiler et al. |
| 2022/0043323 A1 | 2/2022 | Skirlo et al. |
| 2023/0014448 A1 | 1/2023 | Morin et al. |
| 2023/0288707 A1 | 9/2023 | Guan |
| 2023/0333358 A1 | 10/2023 | Ha |
| 2023/0360567 A1 | 11/2023 | Yang |
| 2023/0367073 A1 | 11/2023 | Landig et al. |
| 2023/0367123 A1 | 11/2023 | Amirsolaimani |
| 2023/0367128 A1 | 11/2023 | Ha |
| 2023/0368477 A1 | 11/2023 | Moskalev |
| 2023/0393309 A1 | 12/2023 | Rao et al. |
| 2023/0400690 A1 | 12/2023 | Marsh et al. |
| 2023/0400748 A1 | 12/2023 | Valentine et al. |
| 2023/0408826 A1 | 12/2023 | Oh et al. |

\* cited by examiner

HOLOVISIONS™—ADJUSTABLE AND/OR MODULAR AUGMENTED REALITY (AR) EYEWEAR WITH A MOVABLE TRANSFLECTIVE MIRROR AND DIFFERENT VIEWING MODES

CROSS-REFERENCE TO RELATED APPLICATIONS

This application is a continuation-in-part of U.S. patent application Ser. No. 18/088,548 filed on 2022 Dec. 24. U.S. patent application Ser. No. 18/088,548 was a continuation-in-part of U.S. patent application Ser. No. 17/722,354 filed on 2022 Apr. 17. U.S. patent application Ser. No. 17/722,354 was a continuation-in-part of U.S. patent application Ser. No. 17/501,495 filed on 2021 Oct. 14. U.S. patent application Ser. No. 17/501,495 was a continuation-in-part of U.S. patent application Ser. No. 16/686,170 filed on 2019 Nov. 17. U.S. patent application Ser. No. 17/501,495 claimed the priority benefit of U.S. provisional patent application 63/192,664 filed on 2021 May 25. U.S. patent application Ser. No. 17/501,495 claimed the priority benefit of U.S. provisional patent application 63/212,054 filed on 2021 Jun. 17. U.S. patent application Ser. No. 16/686,170 claimed the priority benefit of U.S. provisional patent application 62/791,359 filed on 2019 Jan. 11. U.S. patent application Ser. No. 16/686,170 was a continuation-in-part of U.S. patent application Ser. No. 16/175,924 filed on 2018 Oct. 31 which issued as U.S. Pat. No. 10,859,834 on 2020 Dec. 8.

U.S. patent application Ser. No. 16/175,924 claimed the priority benefit of U.S. provisional patent application 62/751,076 filed on 2018 Oct. 26. U.S. patent application Ser. No. 16/175,924 claimed the priority benefit of U.S. provisional patent application 62/749,775 filed on 2018 Oct. 24. U.S. patent application Ser. No. 16/175,924 claimed the priority benefit of U.S. provisional patent application 62/746,487 filed on 2018 Oct. 16. U.S. patent application Ser. No. 16/175,924 claimed the priority benefit of U.S. provisional patent application 62/720,171 filed on 2018 Aug. 21. U.S. patent application Ser. No. 16/175,924 claimed the priority benefit of U.S. provisional patent application 62/716,507 filed on 2018 Aug. 9. U.S. patent application Ser. No. 16/175,924 claimed the priority benefit of U.S. provisional patent application 62/714,684 filed on 2018 Aug. 4. U.S. patent application Ser. No. 16/175,924 claimed the priority benefit of U.S. provisional patent application 62/703,025 filed on 2018 Jul. 25. U.S. patent application Ser. No. 16/175,924 claimed the priority benefit of U.S. provisional patent application 62/699,800 filed on 2018 Jul. 18. U.S. patent application Ser. No. 16/175,924 claimed the priority benefit of U.S. provisional patent application 62/695,124 filed on 2018 Jul. 8. U.S. patent application Ser. No. 16/175,924 was a continuation-in-part of U.S. patent application Ser. No. 15/942,498 filed on 2018 Mar. 31 which issued as U.S. patent 1085983410338400 on 2019 Jul. 2. U.S. patent application Ser. No. 16/175,924 claimed the priority benefit of U.S. provisional patent application 62/646,856 filed on 2018 Mar. 22. U.S. patent application Ser. No. 16/175,924 claimed the priority benefit of U.S. provisional patent application 62/638,087 filed on 2018 Mar. 3. U.S. patent application Ser. No. 16/175,924 claimed the priority benefit of U.S. provisional patent application 62/624,699 filed on 2018 Jan. 31.

U.S. patent application Ser. No. 15/942,498 claimed the priority benefit of U.S. provisional patent application 62/646,856 filed on 2018 Mar. 22. U.S. patent application Ser. No. 15/942,498 claimed the priority benefit of U.S. provisional patent application 62/638,087 filed on 2018 Mar. 3. U.S. patent application Ser. No. 15/942,498 claimed the priority benefit of U.S. provisional patent application 62/624,699 filed on 2018 Jan. 31. U.S. patent application Ser. No. 15/942,498 claimed the priority benefit of U.S. provisional patent application 62/572,328 filed on 2017 Oct. 13. U.S. patent application Ser. No. 15/942,498 claimed the priority benefit of U.S. provisional patent application 62/563,798 filed on 2017 Sep. 27. U.S. patent application Ser. No. 15/942,498 claimed the priority benefit of U.S. provisional patent application 62/561,834 filed on 2017 Sep. 22. U.S. patent application Ser. No. 15/942,498 claimed the priority benefit of U.S. provisional patent application 62/528,331 filed on 2017 Jul. 3.

The entire contents of these related applications are incorporated herein by reference.

FEDERALLY SPONSORED RESEARCH

Not Applicable

SEQUENCE LISTING OR PROGRAM

Not Applicable

BACKGROUND—FIELD OF INVENTION

This invention relates to augmented reality eyewear.

INTRODUCTION

Augmented reality (or mixed reality) eyewear superimposes images of virtual objects on a person's view of the real world. Augmented reality eyewear can be embodied in specialized eyeglasses or a head mounted display. There can be a tradeoff between augmented reality eyewear designs which provide the best view (e.g. clear, bright, and opaque) of virtual objects vs. designs which provide the best view (e.g. clear, bright, and wide-angle) of the real world. Currently designs which display the real world via cameras and digital displays provide a better view of virtual objects, but designs which display the real world through pass-through lenses provide a better view of the real world. There is a need for augmented reality eyewear which optimizes, or entirely avoids, this trade off in order to provide a person with good (e.g. clear, bright, opaque, and wide-angle) views of virtual objects and the real world.

REVIEW OF THE RELEVANT ART

U.S. patent application 20130021658 (Miao et al., Jan. 24, 2013, "Compact See-Through Display System") discloses an optical system with a display panel, an image former, a viewing window, a proximal beam splitter, and a distal beam splitter. U.S. patent application 20130077175 (Hotta et al., Mar. 28, 2013, "Display Device") discloses a display device with an image projection unit, an optical unit, and a mounting unit. U.S. patent application 20130314759 (Miao et al., Nov. 28, 2013, "Compact See-Through Display System") discloses an optical system with a display panel, an image former, a viewing window, a proximal beam splitter, and a distal beam splitter.

U.S. patent application 20140003762 (Macnamara, Jan. 2, 2014, "Multiple Depth Plane Three-Dimensional Display Using a Wave Guide Reflector Array Projector") discloses a two-dimensional array of linear wave guides and 2D planar wave guide assemblies. U.S. patent applications 20140036361 (Woodgate et al., Feb. 6, 2014, "Directionally Illuminated Waveguide Arrangement") and 20170139110 (Woodgate et al., May 18, 2017, "Directionally Illuminated Waveguide Arrangement") disclose a light-guiding valve apparatus comprising an optical valve, a two dimensional light source array, and a focusing optic for providing large area collimated illumination from localized light sources. U.S. patent application 20150036223 (Dobschal et al., Feb. 5, 2015, "Display Device Comprising Multifunction Glass, Production Method and Optical Element Having a Fresnel Structure") discloses a multifunction optical element with a Fresnel structure for out coupling.

U.S. patent application 20160161740 (Bar-Zeev et al., Jun. 9, 2016, "Automatic Variable Virtual Focus for Augmented Reality Displays") discloses an augmented reality display wherein a user's focal region is tracked and a virtual object is displayed in that region. U.S. patent application 20160178910 (Giudicelli et al., Jun. 23, 2016, "Optical Projection Device for Display Means Such as Augmented Reality Glasses") discloses augmented reality glasses with a planar optical guide, at least two input optics, and at least two collimation elements. U.S. patent application 20160189432 (Bar-Zeev et al., Jun. 30, 2016, "Automatic Focus Improvement for Augmented Reality Displays") discloses a see-through display with a variable focus lens.

U.S. patent applications 20160335806 (Chan et al., Nov. 17, 2016, "Reprojection OLED Display for Augmented Reality Experiences") and 20170345217 (Chan et al., Nov. 30, 2017, "Reprojection OLED Display for Augmented Reality Experiences") disclose methods for displaying virtual images in an augmented reality environment at a frame rate that is greater than a rendering frame rate. U.S. patent applications 20170285347 (Cai et al., Oct. 5, 2017, "Augmented/Virtual Reality Near-Eye Displays with Edge Imaging Lens Comprising A Plurality of Display Devices"), 20190331923 (Cai et al., Oct. 31, 2019, "Augmented/Virtual Reality Near-Eye Displays with Edge Imaging Lens Comprising a Plurality of Display Devices"), and 20190331924 (Cai et al., Oct. 31, 2019, "Augmented/Virtual Reality Near-Eye Displays with Edge Imaging Lens Comprising a Plurality of Display Devices") disclose a lens with a beam-splitting interface which is horizontal along the width of the lens.

U.S. patent application 20170299869 (Urey et al., Oct. 19, 2017, "Near-to-Eye Display Device") discloses a near-to-eye display device with a spatial light modulator which modulates an illumination wave to create a virtual-scene wave that is steered to an exit pupil plane. U.S. patent application 20170299870 (Urey et al., Oct. 19, 2017, "Apparatus for Generating a Coherent Beam Illumination") discloses an apparatus which generates a coherent illumination beam. U.S. patent application 20180003962 (Urey et al., Jan. 4, 2018, "Near-to-Eye Display Device with Variable Resolution") discloses a near-to-eye display device with a spatial light modulator and a microdisplay.

U.S. patent application 20180003981 (Urey, Jan. 4, 2018, "Near-to-Eye Display Device with Spatial Light Modulator and Pupil Tracker") discloses a near-to-eye display device with a spatial light modulator, a rotatable reflective optical element, and a pupil-tracking device. U.S. patent application 20180074318 (Wheelwright et al., Mar. 15, 2018, "Hybrid Fresnel Lens with Reduced Artifacts") discloses a lens wherein a first portion of a first lens surface is defined by a smooth surface profile function and a second portion of the first lens surface is defined by a Fresnel surface profile function. U.S. patent application 20180074319 (Wheelwright et al., Mar. 15, 2018, "Hybrid Fresnel Lens with Increased Field of View") discloses a lens portion with a Fresnel surface profile. U.S. patent application 20180074324 (Wheelwright et al., Mar. 15, 2018, "Fresnel Lens with Dynamic Draft for Variable Gaze") discloses a lens configured for transmitting light in a first medium to a first reference pupil including an optically transparent substrate having a plurality of Fresnel structures.

U.S. patent application 20180074248 (Shani et al., Mar. 15, 2018, "Slim Waveguide Coupling Apparatus and Method") discloses an illumination structure with a discrete light source near a bottom surface of a waveguide and below a depression in a top surface thereof. U.S. patent applications 20180074320 (Wheelwright et al., Mar. 15, 2018, "Dynamic Draft for Fresnel Lenses"). 20180074323 (Wheelwright et al., Mar. 15, 2018, "Fresnel Lens with Dynamic Draft for Reduced Optical Artifacts"), and 20180074325 (Wheelwright et al., Mar. 15, 2018, "Fresnel Lens with Dynamic Pitch") disclose lenses with a plurality of Fresnel structures. U.S. patent application 20180100959 (Vasylyev, Apr. 12, 2018, "Illumination System Using Edge-Lit Waveguide and Microstructured Surfaces") discloses an apparatus for distributing light from a planar waveguide through an array of elongated surface relief features formed in a major surface of the waveguide.

U.S. patent application 20180143427 (Griffin et al., May 24, 2018, "Optical System for a Display with an Off Axis Projector") discloses an optical projection system that presents a displayed virtual image at a predetermined distance in front of a viewing position. U.S. patent application 20180164882 (Johnson et al., Jun. 14, 2018, "Electronic Device with Adjustable Reflective Display") discloses a tracking system that gathers point-of-gaze information, vergence information, and head position information. U.S. patent application 20180172999 (Sulai et al., Jun. 21, 2018, "Multifocal System with Polarizing Elements") discloses a head-mounted display (HMD) with a multifocal block having one or more possible focal distances.

U.S. patent applications 20180172995 (Lee et al., Jun. 21, 2018, "Waveguide Display with a Small Form Factor, a Large Field of View, and a Large Eyebox"), 20190107723 (Lee et al., Apr. 11, 2019, "Waveguide Display with a Small Form Factor, a Large Field of View, and a Large Eyebox"), and 20200142202 (Lee et al., May 7, 2020, "Waveguide Display with a Small Form Factor, a Large Field of View, and a Large Eyebox") disclose a device with a waveguide display and one or more projectors which project an image light at least along one dimension. U.S. patent applications 20180182150 (Benishti et al., Jun. 28, 2018, "Combining Video-Based and Optic-Based Augmented Reality in a Near Eye Display"), 20190043238 (Benishti et al., Feb. 7, 2019, "Combining Video-Based and Optic-Based Augmented Reality in a Near Eye Display"), and 20190273916 (Benishti et al., Sep. 5, 2019, "Combining Video-Based and Optic-Based Augmented Reality in a Near Eye Display") disclose an array of variably-transparent pixels.

U.S. patent application 20180231784 (Koudsi et al., Aug. 16, 2018, "Optical Display System for Augmented Reality and Virtual Reality") discloses optical display systems and methods for providing three-dimensional and two-dimensional convergence corrected images to a user. U.S. patent application 20180252917 (Takahashi et al., Sep. 6, 2018, "Display Image Projection Apparatus and Display Image Projection System") discloses a free-curved surface Fresnel mirror inside an HUD unit. U.S. patent application 20180252918 (Takahashi et al., Sep. 6, 2018, "Display Image Projection System") discloses an aspherical mirror or a free-curved surface mirror inside an HUD unit.

U.S. patent application 20180284441 (Cobb, Oct. 4, 2018, "Wide Field Head Mounted Display") discloses an optical apparatus with a concave spherical mirror that has a center of curvature at the viewer's pupil. U.S. patent application 20180348524 (Blum et al., Dec. 6, 2018, "Releasably Attachable Augmented Reality System for Eyewear") discloses an Augmented Reality apparatus which uses existing eyewear as an attachment platform. U.S. patent application 20190025602 (Qin et al., Jan. 24, 2019, "Compact Near-Eye Display Optics for Augmented Reality") discloses an optical system with three filter stacks which convert light via circular polarization. U.S. patent application 20190041232 (Maruyama et al., Feb. 7, 2019, "Vehicular Display Device") discloses a vehicular display device which displays a guide route.

U.S. Pat. No. 10,215,698 (Han et al., Feb. 29, 2019, "Multiple Light Paths Architecture and Obscuration Methods for Signal and Perfusion Index Optimization") disclose a photoplethysmographic device with one or more light emitters and one or more light sensors. U.S. patent application 20190090766 (Block et al., Mar. 28, 2019, "Concentric Architecture for Optical Sensing") discloses an electronic device with optical sensing and a concentric architecture. U.S. patent application 20190094537 (Choi et al., Mar. 28, 2019, "Display Device") discloses a display device with a plurality of diffractive optical elements which are each configured to emit light guided through a light guide plate to a user. U.S. patent application 20190094550 (Takagi et al., Mar. 28, 2019, "Virtual Image Display Device") discloses a non-telecentric optical system with an image display unit.

U.S. patent application 20190101764 (Cakmakci, Apr. 4, 2019, "Head-Worn Augmented Reality Display") discloses a combiner and a microdisplay device, wherein the combiner has a curved transparent structure and a reflective surface. U.S. patent application 20190101767 (Geng et al., Apr. 4, 2019, "Fresnel Assembly for Light Redirection in Eye Tracking Systems") discloses a head-mounted device with a display element, a Fresnel assembly, an illumination source, and a camera assembly. U.S. patent application 20190107719 (Edwin et al., Apr. 11, 2019, "Augmented Reality Display Comprising Eyepiece Having a Transparent Emissive Display") discloses an augmented reality head-mounted display system with a transparent emissive display.

U.S. patent application 20190129213 (Cho et al., May 2, 2019, "Display Apparatus") discloses a display apparatus with a liquid crystal panel and a shutter panel. U.S. patent application 20190158810 (Cho et al., May 23, 2019, "Multi-Lens Based Capturing Apparatus and Method") discloses a multi-lens capturing apparatus. U.S. patent application 20190162950 (Lapstun, May 30, 2019, "Head-Mounted Light Field Display") by the genius from down under discloses a head-mounted light field display device with at least one multiplexed light field display module adapted to face an eye of a viewer wearing the device, the multiplexed light field display module comprising a light field view image generator and a waveguide with a set of shutters. U.S. patent application 20190165052 (Son et al., May 30, 2019. "Display Device and Eyeglasses-Like Augmented Reality Device Using the Same") discloses a display with a lower substrate, an upper substrate, an insulating layer over the lower substrate, and an organic light-emitting diode on the insulating layer.

U.S. patent application 20190187472 (Choi et al., Jun. 20, 2019, "Optical System and Wearable Display Apparatus Having the Same") discloses an optical system with a first waveguide, a transmissive reflective layer on the first waveguide, a second waveguide on the transmissive reflective layer, an in-coupler, and an out-coupler. U.S. patent application 20190227315 (Sun et al., Jul. 25, 2019, "Systems and Methods of Attenuating Light in a Display") discloses a display with a first light source, a second light source, a movable mirror, and an attenuator.

U.S. patent applications 20190228586 (Bar-Zeev et al., Jul. 25, 2019, "Opacity Filter for Display Device") and 20190378338 (Bar-Zeev et al., Dec. 12, 2019, "Opacity Filter for Display Device") disclose an optical see-through head-mounted display with a see-through lens and an opacity filter is used to selectively block portions of the real-world scene. U.S. patent application 20190227305 (Fortin-Desch Nes et al., Jul. 25, 2019, "Optical Arrangements Including Fresnel Lens Elements") discloses an optical lens arrangement with a first Fresnel lens element and a second lens element.

U.S. patent application 20190235252 (Freedman et al., Aug. 1, 2019, "Method and System for Large Field of View Display with Scanning Mirror Having Optical Power") discloses an image display system with light sources which are configured to emit uncollimated light and also an eyepiece waveguide having an input port which receives beams of light at differing angles. U.S. patent application 20190235281 (Etzkorn et al., Aug. 1, 2019, "Eye-Mountable Device to Provide Automatic Accommodation and Method of Making Same") discloses an eye-mountable device with a lens enclosure, liquid crystal material, first and second electrodes, a substrate, and a controller. U.S. patent application 20190265476 (Blum et al., Aug. 29, 2019, "See-Through Near Eye Optical Module") discloses a semi-transparent near eye optical module with a transparent sparsely populated near eye display comprising a plurality of pixels or pixel patches and a sparsely populated micro-lens array.

U.S. patent application 20190265515 (Lee et al., Aug. 29, 2019, "Failsafe Operation of Eye-Mountable Device") discloses an eye-mountable device with an optical lens, an accommodation actuator to provide vision accommodation for the optical lens, and a controller including an accommodation logic to select one of a plurality of vision accommodation states for the device. U.S. patent application 20190278092 (Kuo et al., Sep. 12, 2019, "Augmented Reality Display System and Display Method Thereof") discloses an augmented reality display system with an input unit, an operation processing unit, and an output unit. U.S. patent application 20190282399 (Goetz, Sep. 19, 2019. "Ultrasonic Ophthalmic Device") discloses an ophthalmic device with an ultrasonic transducer, an accommodation actuator, and a controller.

U.S. patent application 20190285960 (Sasa et al., Sep. 19, 2019, "Electrochromic Device, Electronic Dimming Eyeglasses, Augmented Reality Eyeglasses, and Camera") discloses an electrochromic device which is reversibly and controllably colored and decolored by electricity. U.S. patent application 20190289284 (Smith et al., Sep. 19, 2019, "Light Field Capture and Rendering for Head-Mounted Displays") discloses systems and methods for capturing and rendering light fields for head-mounted displays. U.S. patent application 20190293938 (Le Saux et al., Sep. 26, 2019, "Method for Providing a Display Unit for an Electronic Information Device") discloses a display device with an optical element having a nonzero optical power.

U.S. patent application 20190294019 (Park et al., Sep. 26, 2019, "Beam Scanning Apparatus and Optical Apparatus Including the Same") discloses a beam scanning apparatus with a reflective phased array device. U.S. patent application 20190294109 (Lee et al., Sep. 26, 2019, "Holographic Display Device") discloses a holographic display with a backlight unit for emitting light and a spatial light modulator. U.S. patent application 20190331918 (Hong, Oct. 31, 2019, "Display System and Image Display Method") discloses a display, a waveguide, an image acquisition device, and a calibration device. U.S. patent application 20190339528 (Freeman et al., Nov. 7, 2019, "Wearable Image Manipulation and Control System with High Resolution Micro-Displays and Dynamic Opacity Augmentation in Augmented Reality Glasses") discloses a mixed reality display with dynamic opacity.

U.S. patent applications 20190348460 (Chen et al., Nov. 14, 2019, "Multi-Photodiode Pixel Cell") and 20190378872 (Chen et al., Dec. 12, 2019, "Multi-Photodiode Pixel Cell") disclose a semiconductor substrate including first and second photodiodes and a barrier layer between the photodiodes, wherein the photodiodes and the barrier layer form a stack. U.S. patent application 20190352808 (Yoon et al., Nov. 21, 2019, "Electronically Functional Yarn and Textile") discloses integrating electronic functionality into textiles. U.S. patent application 20190353906 (Gollier et al., Nov. 21, 2019, "Optical Assembly with Polarization Volume Holographic Element") discloses an optical assembly with a partial reflector that is optically coupled with a first polarization volume holographic element. U.S. patent application 20190361245 (Lanman et al., Nov. 28, 2019, "Augmented Reality Head-Mounted Display with a Fresnel Combiner and Pupil Steering") discloses a head-mounted display with a light projector and a Fresnel combiner.

U.S. patent application 20190371065 (Anders et al., Dec. 5, 2019, "Augmented Reality Masking") discloses masks for the portion of a scene which is not processed for viewing via augmented reality. U.S. patent application 20190377182 (Sharp, Dec. 12, 2019, "Reverse-Order Crossed Pancake Lens with Azimuthal Compensation") discloses a pancake lens block with azimuthal compensation. U.S. patent application 20190377183 (Sharp, Dec. 12, 2019, "Reverse-Order Crossed Pancake Lens with a Shaped Polarizer") discloses a pancake lens block with a shaped reflective polarizer. U.S. patent application 20190377184 (Sharp et al., Dec. 12, 2019, "Reverse-Order Crossed Pancake Lens with Index Gradient Structure") discloses a reverse-order crossed pancake lens block having an index gradient structure.

U.S. patent application 20190377186 (Collins, Dec. 12, 2019, "Systems and Methods for Augmented Reality Display") discloses an augmented reality system with a power source, a sensor array, a lens, and a projector. U.S. patent application 20190385342 (Freeman et al., Dec. 19, 2019, "Wearable Image Manipulation and Control System with Micro-Displays and Augmentation of Vision and Sensing in Augmented Reality Glasses") discloses a wearable mixed reality system comprising a camera and an image projection system. U.S. patent application 20190391396 (Saarikko, Dec. 26, 2019, "Tiled Waveguide Display with a Wide Field-Of-View") discloses a waveguide display with light sources, a source waveguide, an output waveguide, and a controller.

U.S. patent application 20200012110 (Blum et al., Jan. 9, 2020, "Augmented Reality or Mixed Reality System for Eyewear") discloses a see-through display with a micro-lens array. U.S. patent application 20200026076 (Beckman, Jan. 23, 2020, "Augmented Reality Display Systems with Variable, Directional Light Transmission Enhancing Virtual Images at an Observation Point") discloses a matrix of light-augmenting pixels in a variable-transmission semi-transparent screen. U.S. patent application 20200033693 (Lu et al., Jan. 30, 2020, "Varifocal System Using Hybrid Tunable Liquid Crystal Lenses") discloses a varifocal system with a stacked first-type liquid crystal lens and a stacked second-type LC lens in series.

U.S. patent application 20200041798 (Kress et al., Feb. 6, 2020, "Head Wearable Display Using Powerless Optical Combiner") discloses a lightguide with internal optical elements that redirect the light with an expanded cross-section size that is larger than the initial cross-section size. U.S. patent application 20200064627 (Ouderkirk et al., Feb. 27, 2020, "Illumination Assembly with In-Field Micro Devices") discloses a transparent substrate and a plurality of micro devices coupled to conductive pathways. U.S. patent application 20200081252 (Jamali et al., Mar. 12, 2020, "Polarization-Sensitive Components in Optical Systems for Large Pupil Acceptance Angles") discloses an eye tracking module and optical elements combined to allow changes in the positions of one or both eyes.

U.S. patent application 20200110268 (Robbins et al., Apr. 9, 2020, "Compact Optical System with MEMS Scanners for Image Generation and Object Tracking") discloses an optical system with micro electro mechanical system (MEMS) scanners to generate images and to scan the real world. U.S. patent application 20200117005 (Chi et al., Apr. 16, 2020, "Waveguide for Conveying Multiple Portions of Field of View") discloses a waveguide for conveying light carrying an image. U.S. patent application 20200124858 (Cakmakci, Apr. 23, 2020, "Freeform Head Mounted Display") discloses lenses having a combined optical power to form a curved intermediate image.

U.S. patent application 20200132919 (Cakmakci, Apr. 30, 2020, "Curved Optical See-Through Thin Freeform Lightguide with Large Field of View in Eyewear Formfactor") discloses a lightguide, a microdisplay, and a field lens positioned therebetween that directs light from the microdisplay into a top surface of the lightguide. U.S. patent application 20200142109 (Olkkonen et al., May 7, 2020, "Display Element, Personal Display Device, Method of Producing an Image on a Personal Display and Use") discloses a lightguide that guides light by total internal reflection, a diffractive in-coupling grating, and a diffractive out-coupling grating.

U.S. patent application 20200159026 (Waldern et al., May 21, 2020, "Wearable Heads Up Displays") discloses a display with a first waveguide, an input grating, a fold grating, an output grating, an image input image node assembly, and prismatic relay optics. U.S. patent application 20200166691 (Vartiainen et al., May 28, 2020, "Diffractive Grating with Variable Diffraction Efficiency and Method for Displaying an Image") discloses an optical grating with a first zone and a second zone, each having a two-dimensionally periodic grating structure. U.S. patent application 20200166756 (DeLapp et al., May 28, 2020, "Displays with Volume Phase Gratings") and U.S. Pat. No. 11,467,407 (DeLapp et al., Oct. 11, 2022, "Displays with Volume Phase Gratings") discloses input and output couplers made from volume phase holographic gratings.

U.S. patent application 20200174255 (Hollands et al., Jun. 4, 2020, "Optical Systems with Multi-Layer Holographic Combiners") discloses first hologram structures that replicate light over multiple output angles onto second hologram structures. U.S. patent application 20200192095 (Puetz et al., Jun. 18, 2020, "Eyeglass Lens for an Optical Imaging Element, and Augmented Reality Glasses") discloses a lens with a main body and at least one complementary element mounted on the main body. U.S. patent applications 20200192152 (Jamali et al., Jun. 18, 2020, "Optical System Using Segmented Phase Profile Liquid Crystal Lenses") and 20210240036 (Jamali et al., Aug. 5, 2021, "Optical System Using Segmented Phase Profile Liquid Crystal Lenses") disclose an adaptive lens which is coupled to an electronic display between an electronic display and a user's eyes.

U.S. Pat. No. 10,690,986 (Firka et al., Jun. 23, 2020, "Electronic Devices Having Electrically Adjustable Optical Shutters") discloses an electrically adjustable shutter. U.S. patent application 20200209626 (Huang et al., Jul. 2, 2020, "Near-Eye Augmented Reality Device") discloses a near-eye augmented reality device with imaging unit portions having birefringence and positive diopter, a lighting unit, and a polarization-control unit. U.S. patent application 20200225479 (Chi et al., Jul. 16, 2020, "Volume Bragg Gratings for Near-Eye Waveguide Display") discloses a waveguide display with a substrate which is transparent to visible light, a coupler configured to couple display light into the substrate such that the display light propagates within the substrate through total internal reflection, a first multiplexed volume Bragg grating (VBG) on the substrate, and a second multiplexed VBG on the substrate.

U.S. patent application 20200249480 (Martinez et al., Aug. 6, 2020, "Multi-Focal Catadioptric Head Mounted Display with LC Switch") discloses a beam splitter with a polarization beam splitting film and a mirror coating to generate two orthogonal polarization states with different optical paths. U.S. patent application 20200257065 (Chi et al., Aug. 13, 2020, "Dispersion Compensation for Light Coupling Through Slanted Facet of Optical Waveguide") discloses a pupil expander with a waveguide having a slanted facet. U.S. patent application 20200259307 (Sharma et al., Aug. 13, 2020, "Optical Elements for Beam-Shaping and Illumination") discloses a device with a light source, an optical element, and an encapsulant layer.

U.S. patent application 20200271936 (Leibovici et al., Aug. 27, 2020, "Near-Eye Display System Having Optical Combiner") discloses a device with an optical waveguide and a plurality of grating structures having variable grating periods or slant angles. U.S. patent application 20200271938 (Taylor et al., Aug. 27, 2020, "Super-Resolution Scanning Display for Near-Eye Displays") discloses a super-resolution scanning display with a light source, a conditioning assembly, and a scanning mirror assembly. U.S. Pat. No. 10,768,451 (Carlson, Sep. 8, 2020, "Diffusers in Wearable Devices") discloses a diffuser that diffuses light in a radial anisotropic diffusion pattern or a prism-like diffusion pattern.

U.S. patent applications 20200281458 (Zimanyi, Sep. 10, 2020, "Guided Lens Design Exploration Method for a Progressive Lens Simulator") and 20200281457 (Zimanyi, Sep. 10, 2020, "Guided Lens Design Exploration System for a Progressive Lens Simulator") disclose a progressive lens simulator with an eye tracker. U.S. patent application 20200301151 (Freedman et al., Sep. 24, 2020, "Method and System for Large Field of View Display with Scanning Mirror Having Optical Power") discloses a display system with a plurality of light sources and a waveguide having an input port configured to receive beams of light at differing angles. U.S. patent application 20200301153 (Toleno et al., Sep. 24, 2020, "Near Eye Display (NED) Device Housing Shell Integrated with Molded Boss Clusters for Precision Mounting of Hardware Components") discloses a near-eye display device with a housing shell which is integrated with molded boss clusters.

U.S. patent application 20200301239 (Akkaya et al., Sep. 24, 2020, "Varifocal Display with Fixed-Focus Lens") dis- closes a display with a projector, an optical waveguide, a fixed-focus lens, and a variable-focus lens. U.S. patent application 20200303151 (Du et al., Sep. 24, 2020, "Method and System for Adjusting Focal Point Position") discloses ways to adjust a focal point position of an X-ray tube. U.S. patent application 20200333596 (Yoon et al., Oct. 22, 2020, "Reflective Polarizer for Augmented Reality and Virtual Reality Display") discloses a head-mounted display with a first reflective polarizer having a first optical surface and a second optical surface that is opposite to the first optical surface.

U.S. patent application 20200334907 (Bender et al., Oct. 22, 2020, "Dynamic Partition of Augmented Reality Region") discloses boundary dimension values for different areas relative to a reference geographic location. U.S. patent application 20200336731 (Welch et al., Oct. 22, 2020, "Light Projector Using an Acousto-Optical Control Device") discloses using surface acoustic waves along a substrate to guide image light to different areas. U.S. patent application 20200345293 (Ras et al., Nov. 5, 2020, "Device for Imaging Skin") discloses a skin imaging device. U.S. patent application 20200348514 (Chi et al., Nov. 5, 2020, "Waveguide Including Volume Bragg Gratings") discloses a waveguide with Volume Bragg Gratings (VBGs).

U.S. patent application 20200348518 (Georgiou et al., Nov. 5, 2020, "Near-Eye Peripheral Display Device") discloses a head-mounted, near-eye display device with a central display and a peripheral display. U.S. patent applications 20200348522 (Xiao et al., Nov. 5, 2020, "Wearable AR System, AR Display Device and Its Projection Source Module") and 20200371371 (Liang et al., Nov. 26, 2020, "Wearable AR System, AR Display Device and Its Projection Source Module") disclose an augmented reality display comprising a projection source with a curved light outgoing surface. U.S. patent application 20200355929 (Zhang et al., Nov. 12, 2020, "Holographic Optical Elements for Eye-Tracking Illumination") discloses eye-tracking with a substrate transparent to visible light, an array of light sources in the substrate, and a holographic optical element coupled to the substrate.

U.S. patent application 20200371280 (Geng et al., Nov. 26, 2020, "Optical Waveguide Beam Splitter with Polarization Volume Gratings for Display") discloses an optical device for providing illumination light with a waveguide and a plurality of polarization selective elements. U.S. patent application 20200371362 (Xiao et al., Nov. 26, 2020, "Wearable AR System and AR Display Device") discloses a projector, a first optical path having a first beamsplitter and a first reflector, and a second optical path having a second beamsplitter and a second reflector. U.S. patent application 20200371387 (Gollier et al., Nov. 26, 2020, "Optical Waveguide Beam Splitter with Reflective Polarizers for Display") discloses an optical device with a waveguide and a plurality of reflective polarizers.

U.S. patent application 20200371388 (Geng et al., Nov. 26, 2020, "Optical Waveguide Beam Splitter with Extraction Features for Display") discloses an optical device with a spatial light modulator and an optical waveguide. U.S. patent application 20200393736 (Hu, Dec. 17, 2020, "Display Glasses Using Meta-Surface Planar Lens Integrated with Liquid Lens") discloses an integrated lens with a planar lens and a liquid lens. U.S. patent application 20200393910 (Gribetz et al., Dec. 17, 2020, "Extramissive Spatial Imaging Digital Eye Glass Apparatuses, Methods and Systems for Virtual or Augmediated Vision, Manipulation, Creation, or Interaction with Objects, Materials, or Other Entities") discloses a first phenomenon interface a first augmediated-reality space, a second phenomenon interface, and a second augmediated-reality space, implemented as an extramissive spatial imaging digital eye glass.

U.S. patent application 20200396431 (Stafford, Dec. 17, 2020, "Foveated Near to Eye Display System Using a Computational Freeform Lens via Spatial Light Modulation of a Laser Projected Image onto an Emissive Film") discloses a projection system wherein light is projected through a spatial light modulator that contains a phase-only image of a Freeform Fourier Lens that is a combination of a Fresnel lens, an X-phase grating, a Y-phase grating, and a radial grating. U.S. patent application 20200400955 (Messer et al., Dec. 24, 2020, "Eyepieces for Augmented Reality Display System") discloses an augmented reality display with an eyepiece waveguide with an input coupling grating region. U.S. patent application 20200408981 (Curtis et al., Dec. 31, 2020, "Display System Having a Plurality of Light Pipes for a Plurality of Light Emitters") discloses a display system with a plurality of light pipes and light sources which send light into the light pipes.

U.S. patent application 20210003848 (Choi et al., Jan. 7, 2021, "Electronic Device and Method for Displaying Augmented Reality") discloses an optical engine; a first polarizer, a polarization converter, a waveguide, a focus tunable lens, and a second polarizer. U.S. patent applications 20210011290 (Maimone et al., Jan. 14, 2021, "Method to Reduce Diffraction Artifacts in a Waveguide Display and Display Using the Same") and 20210215938 (Maimone et al., Jul. 15, 2021, "Method to Reduce Diffraction Artifacts in a Waveguide Display and Display Using the Same") disclose a waveguide with at least one switchable grating configured to: during a virtual-world subframe of a display frame, decouple the image light out of the waveguide via diffraction, and during a real-world subframe of the display frame, transmit a light from a real-world environment to the eyebox.

U.S. patent application 20210018657 (Tsai et al., Jan. 21, 2021, "Optical Module Comprising Lens Assembly") discloses a lens assembly with polymer layers, each layer with a lens portion and an extension portion and an image sensor positioned below the lens assembly. U.S. patent application 20210026138 (Alasaarela et al., Jan. 28, 2021, "Projection Device and Projection Method for Head Mounted Display Based on Rotary MEMS Fast Scanner") discloses a microelectromechanical system (MEMS) coupled to a microscopic mirror. U.S. patent application 20210033790 (Ward et al., Feb. 4, 2021, "MEMS-Driven Optical Package with Micro-Led Array") discloses an optical output lens, an optical filter between the output lens and LEDS, a tray of LEDs arrayed on a stage.

U.S. patent application 20210041704 (Bhargava et al., Feb. 11, 2021, "Eyepieces for Augmented Reality Display System") discloses a waveguide, an optically transmissive substrate, an input coupling grating, a multi-directional pupil expander, and an exit pupil expander. U.S. patent application 20210051315 (Shamir et al., Feb. 18, 2021. "Optical Display, Image Capturing Device and Methods with Variable Depth of Field") discloses a pixelated illumination array and a fiber bundle. U.S. patent application 20210055466 (Eisenfeld, Feb. 25, 2021, "Projector Configuration with Subdivided Optical Aperture for Near-Eye Displays, and Corresponding Optical Systems") discloses a system for displaying a projected image with a light-guide optical element having two major parallel surfaces and a projected image collimated to infinity.

U.S. patent application 20210055546 (Shin et al., Feb. 25, 2021, "Image Display Device Capable of Multi-Depth Expression") discloses an display configured to modulate light to form an image, a light transmitting unit that transmits the image formed by the display device to eyes of a viewer and with a focusing member, and a driving unit. U.S. patent application 20210055548 (Rao et al., Feb. 25, 2021, "Reconfigurable Optics for Multi-Plane Heads-Up Displays") discloses a display, a moveable optic, an optical element positioned between the display and the moveable optic, a lens actuator, and a display controller. U.S. patent application 20210055551 (Chi et al., Feb. 25, 2021, "Dispersion Compensation in Volume Bragg Grating-Based Waveguide Display") discloses a waveguide with a substrate transparent to visible light, a coupler configured to couple display light into the substrate as a guided wave in the substrate, a first VBG, and a second VBG.

U.S. patent application 20210055552 (Chi et al., Feb. 25, 2021, "Multiple Projector Field-Of-View Stitched Waveguide Display") discloses a waveguide display with two light projectors. U.S. patent application 20210055560 (Ben Tez et al., Feb. 25, 2021, "Compact Optics in Crossed Configuration for Virtual and Mixed Reality") discloses an optical system with channels which generate immersive virtual images. U.S. patent application 20210055561 (Danziger et al., Feb. 25, 2021, "Near-Eye Display Having Overlapping Projector Assemblies") discloses a display with at least two projectors. U.S. patent application 20210055563 (Bouchier et al., Feb. 25, 2021, "Methods and Systems for Augmented Reality") discloses a see-through tunable holographic mirror or tunable LCD array mirror.

U.S. patent application 20210055580 (Wells et al., Feb. 25, 2021, "Transparent Phase Change Actuator") discloses a transparent optical element with electroactive ceramic between transparent electrodes. U.S. patent application 20210063606 (Glik et al., Mar. 4, 2021, "Metasurface Optical Coupling Elements for a Display Waveguide") discloses a waveguide display with a light-transmissive substrate and an optical coupling element configured to input light rays to the substrate or output light rays from the substrate. U.S. patent application 20210063733 (Ronen, Mar. 4, 2021, "Optical System Including Light-Guide Optical Element with Partially-Reflective Internal Surfaces") discloses a light-guide optical element having a pair of parallel external surfaces and a set of mutually-parallel reflector surfaces.

U.S. patent application 20210063774 (Wang et al., Mar. 4, 2021. "Eyeglasses") discloses eyeglasses with a rim, a temple, a control circuit or battery, and a rotating shaft connecting the rim and temple. U.S. patent application 20210065427 (Wade, Mar. 4, 2021, "Virtual and Augmented Reality Using Light Fields") discloses communicating light field data to a user device, wherein the light field data comprises content greater than a display field of view of the user device. U.S. patent application 20210066402 (Pu et al., Mar. 4, 2021, "Display Substrate, Display Panel, and Manufacturing Method of Display Substrate") discloses a display with a base substrate, a first electrode, a light-emitting functional layer, and a second electrode.

U.S. patent application 20210066574 (Diest et al., Mar. 4, 2021, "Structured Actuators: Shaped Electroactive Polymers") discloses an electroactive polymer layer with a non-axisymmetric shape. U.S. patent application 20210072821 (Von Und Zu Liechtenstein, Mar. 11, 2021, "Apparatus and Method for Rendering a Virtual Monitor on Smart Ophthalmic Devices in Augmented Reality Environments") discloses a liquid lens, an optical phased array, and a dimmable occlusion matrix. U.S. patent application 20210072437 (Singh et al., Mar. 11, 2021, "Display Device with Diffraction Grating Having Reduced Polarization Sensitivity") discloses diffraction gratings which incouple or outcouple light of different polarizations. U.S. patent application 20210072453 (Peng et al., Mar. 11, 2021, "Display with Switchable Retarder Array") discloses a waveguide, an array of tunable retarders, and a polarization selective optical element.

U.S. patent application 20210072541 (Kim et al., Mar. 11, 2021, "Electronic Device and Method for Controlling Electronic Device") discloses a display, a speaker, and a communication module. U.S. patent application 20210072559 (Wang et al., Mar. 11, 2021. "Eyeglasses") discloses an eyeglass frame and two speakers. U.S. patent application 20210072585 (Shipton et al., Mar. 11, 2021, "Magnetic Field Driven Liquid Crystal Patterning Control System") discloses liquid crystal patterning control systems in which liquid crystals are aligned by magnetic fields.

U.S. patent application 20210074067 (Kwon et al., Mar. 11, 2021, "Electronic Device for Displaying Object for Augmented Reality and Operation Method Therefor") discloses selecting an augmented reality (AR) object based on received music. U.S. patent application 20210080635 (Menezes et al., Mar. 18, 2021, "Waveguides Having Reflective Layers Formed by Reflective Flowable Materials") discloses a surface of a waveguide that is contacted with a reflective flowable material. U.S. patent application 20210080725 (Sulai et al., Mar. 18, 2021, "Display Device with Holographic Diffuser Display and See-Through Lens Assembly") discloses an optical diffuser which outputs diffused image light having a same polarization as image light.

U.S. patent application 20210080726 (Geng et al., Mar. 18, 2021, "Display Device with Diffusive Display and See-Through Lens Assembly") discloses a display which is configured to output diffused image light from a first surface and to transmit ambient light from a second surface to the first surface. U.S. patent application 20210080730 (Morrison et al., Mar. 18, 2021, "Transparent Optical Module Using Pixel Patches and Associated Lenslets") discloses a transparent optical device comprising an optical architecture hierarchy. U.S. patent application 20210080739 (Geng et al., Mar. 18, 2021, "Short Distance Illumination of a Spatial Light Modulator Using a Pancake Lens Assembly") discloses a light source, a spatial light modulator (SLM), a first reflective surface, and a second reflective surface that is opposite to the first reflective surface.

U.S. patent application 20210080763 (Sulai et al., Mar. 18, 2021, "Display Device with Switchable Diffusive Display and See-Through Lens Assembly") discloses a display having optically anisotropic molecules between a front surface and a back surface. U.S. patent application 20210080906 (Jolly et al., Mar. 18, 2021, "Near-To-Eye and See-Through Holographic Displays") discloses a holographic display with space-multiplexed elemental modulators, each of which consists of a surface acoustic wave transducer atop an anisotropic waveguide.

U.S. patent applications 20210080721 (Geng et al., Mar. 18, 2021, "Thin See-Through Pancake Lens Assembly and Display Device Including the Same") and 20210080722 (Geng et al., Mar. 18, 2021, "Curved See-Through Pancake Lens Assembly and Display Device Including the Same") disclose an optical assembly which transmits image light received at a first surface in an optical path that includes reflection at each of a reflector and a beam splitter before the image light is output from a second surface. U.S. patent applications 20210080724 (Sulai et al., Mar. 18, 2021, "Display Device with Transparent Emissive Display and See-Through Lens Assembly") and 20210080763 (Sulai et al., Mar. 18, 2021, "Display Device with Switchable Diffusive Display and See-Through Lens Assembly") disclose a display which outputs image light from a front surface and transmits ambient light from a back surface to the front surface.

U.S. patent application 20210088700 (Wang et al., Mar. 25, 2021, "Varifocal Polarization Sensitive Diffusive Display") discloses a variofocal display with an image source and a display. U.S. patent application 20210088794 (Melville, Mar. 25, 2021, "Waveguide Display with Cantilevered Light Scanner") discloses glasses with an optical scanning system that protrudes through an opening in an eyepiece. U.S. patent application 20210088795 (Cheng et al., Mar. 25, 2021, "Wide Angle and High Resolution Tiled Head-Mounted Display Device") discloses a tiled head-mounted display with a plurality of prisms with free-form surfaces. U.S. patent application 20210089129 (Osterhout et al., Mar. 25, 2021, "See-Through Computer Display Systems") discloses designs for see-through computer displays. U.S. Pat. No. 10,962,783 (Wilson et al., Mar. 30, 2021, "Electronic Devices Having Electrically Adjustable Optical Layers") discloses an electrically-adjustable optical layer.

U.S. patent application 20210096380 (Osmanis et al., Apr. 1, 2021, "Near-Eye Display Apparatus and Method of Displaying Three-Dimensional Images") discloses projecting pairs of images associated with different cross-sectional planes of a three-dimensional image. U.S. patent application 20210096391 (Ma et al., Apr. 1, 2021, "Holographic Display, Holographic Display Device and Display Method Thereof") discloses a holographic display with a central display area and at least one annular tiled display area around the central display area. U.S. patent application 20210096453 (Wheelwright et al., Apr. 1, 2021, "Optical Assemblies Having Polarization Volume Gratings for Projecting Augmented Reality Content") discloses a display with an optical waveguide, a reflective optical element, and an in-coupler.

U.S. patent application 20210103145 (You et al., Apr. 8, 2021, "Augmented Reality Device Including Flat Combiner and Electronic Device Including the Same") discloses a light source, a display comprising a plurality of pixels, and an optical combiner. U.S. patent application 20210103180 (Sears et al., Apr. 8, 2021, "Photochromic Optical Element") discloses an optical element with a first boundary layer, a second boundary layer, and liquid crystals co-mingled with oblong photochromic dye molecules. U.S. patent application 20210103182 (Tan et al., Apr. 8, 2021, "Display Apparatus and Driving Method Thereof") discloses display panels which are substantially parallel to each other and spaced apart from each other along a depth direction.

U.S. patent application 20210109278 (Peroz et al., Apr. 15, 2021, "Waveguides Having Integrated Spacers, Waveguides Having Edge Absorbers, and Methods for Making the Same") discloses a near-eye display comprising a stack of waveguides having integral spacers separating the waveguides. U.S. patent application 20210109352 (Lee et al., Apr. 15, 2021, "See-Through Type Display Device and Glasses Type Augmented Reality Device Including the Same") discloses a see-through display with a light coupling lens with an aspherical surface. U.S. patent application 20210109433 (Trisnadi et al., Apr. 15, 2021, "Low-Profile Beam Splitter") discloses an optical device having a first surface, a second surface normal to the first surface, and a third surface at an angle to the second surface.

U.S. patent application 20210112647 (Coleman, Apr. 15, 2021, "Angularly Varying Light Emitting Device with an Imager") discloses an angularly varying light emitting device (AVLED). U.S. patent application 20210191125 (Li et al., Jun. 24, 2021, "Display with Holographic Relay and Holographic Image Combiner") discloses a device with an image source, a holographic relay, and a holographic image combiner in an off-axis configuration. U.S. Pat. No. 11,086,143 (Gill et al., Aug. 10, 2021. "Tunable and Foveated Lens Systems") discloses eyeglasses with adjustable lenses that align with a user's eye. U.S. patent application 20210255490 (Parsons et al., Aug. 19, 2021, "Resonant Liquid Crystal Devices") discloses a tunable liquid crystal device with a liquid crystal layer between a pair of reflectors.

U.S. Pat. No. 11,215,829 (Topliss et al., Jan. 4, 2022, "Display Device with a Holographic Combiner") discloses an augmented reality headset with a reflective holographic combiner which directs light from a light engine into a user's eye while also transmitting light from the environment.

U.S. patent application 20220006987 (Seiler et al., Jan. 6, 2022, "Multi-Projector Display Architecture") discloses a headset display with multiple projector integrated circuits each coupled to a central processor. U.S. patent application 20220043323 (Skirlo et al., Feb. 10, 2022, "Methods and Systems for Optical Beam Steering") discloses an optical beam steering device with a planar dielectric lens that collimates beams from different inputs in different directions. U.S. patent application 20230014448 (Morin et al., Jan. 19, 2023, "Methods for Handling Occlusion in Augmented Reality Applications Using Memory and Device Tracking and Related Apparatus") discloses devices which handle optical occlusion in augmented reality.

U.S. patent application 20230288707 (Guan, Sep. 14, 2023, "Near-To-Eye Display Device") discloses eyewear with an electronic display and a collimating device with a microlens array. U.S. patent application 20230333358 (Ha, Oct. 19, 2023, "Optical Device for Augmented Reality Having Optical Structure Arranged in Straight Line and Method for Manufacturing Optical Means") discloses an optical device for augmented reality having an optical structure which is arranged in a straight line. U.S. patent application 20230360567 (Yang, Nov. 9, 2023, "Virtual Reality Display System") discloses a near-eye display device with a camera to track the location of an eye pupil, a projection light source to provide a collimated beam, and a micromirror array with adjustable micromirror pixels.

U.S. patent application 20230367073 (Landig et al., Nov. 16, 2023, "Waveguide with Tunable Bulk Reflectors") discloses a waveguide, an input coupler for propagating image light along a zigzag light path, and a plurality of slanted bulk mirrors along the light path. U.S. patent application 20230367123 (Amirsolaimani, Nov. 16, 2023, "Field of View Expansion by Image Light Redirection") discloses a beam redirector which is downstream of a lightguide for controllably redirecting the image light in coordination with displaying different field of view portions by an image projector. U.S. patent application 20230367128 (Ha, Nov. 16, 2023, "Compact Optical Device for Augmented Reality Having Straightly-Arranged Optical Structure, and Method for Manufacturing Optical Means") discloses a compact optical device with an optical means to transmit at least part of real object image light therethrough toward the pupil of a user's eye, a first reflective means, and a second reflective means with a plurality of reflective units.

U.S. patent application 20230368477 (Moskalev, Nov. 16, 2023, "Augmented and Mixed Reality Screen") discloses reusing image rays incoupled into a waveguide from projectors from different directions around the perimeter of an outcoupling diffractive element. U.S. patent application 20230393309 (Rao et al., Dec. 7, 2023, "Fresnel Lens with Organic Solid Crystals") discloses a Fresnel lens with a lens body having a structured surface with a plurality of facets, wherein the lens body includes an organic solid crystal having mutually-orthogonal refractive indices. U.S. patent application 20230400690 (Marsh et al., Dec. 14, 2023, "Mixed Reality Eyewear with Deformable Beam Combiner") discloses eyewear with a frame, a lens, a display panel which renders an image not aligned with an eye of the wearer, and a deformable beam combiner.

U.S. patent application 20230400748 (Valentine et al., Dec. 14, 2023, "Display System with Tunable Wavelength Conversion in a Nanophotonic Periodically Poled Lithium Niobate Waveguide") discloses a tunable light source with a periodically-poled lithium niobate waveguide and a control mechanism. U.S. patent application 20230408826 (Oh et al., Dec. 21, 2023, "Near-Eye Display Architectures") discloses kaleidoscopic waveguide display architectures, geometrical waveguide displays with improved pupil replication density, liquid crystal displays with improved brightness uniformity, tiled display panels for field of view expansion, and display modules including over-molded frame with integrated heat sink fins. U.S. Pat. No. 11,885,968 (Hua et al., Jan. 30, 2024, "Pupil Matched Occlusion-Capable Optical See-Through Head-Mounted Display") discloses see-through head mounted displays with a double-wrapped path which can render per-pixel mutual occlusion.

SUMMARY OF THE INVENTION

The augmented reality eyewear designs which are disclosed herein address the limitations of the current art by providing a person with good (e.g. clear, bright, opaque, and wide-angle) views of virtual objects and the real world. Disclosed herein is adjustable and/or modular augmented reality eyewear with a first mode which optimizes the person's view of the real world and a second mode which optimizes the person's view of virtual objects. A transflective mirror (e.g. such as a beam splitter) is a partially-reflective optical component which transmits a portion of incident light and reflects a portion of incident light. As disclosed herein, the mode of augmented reality eyewear can be changed by moving a transflective mirror from a first configuration (e.g. a first location) to a second configuration (e.g. a second location), wherein the second location is in the person's field of view. When the transflective mirror in in the person's field of view and reflected light from a display toward the person's eyes, then it displays a virtual object in the person's field of view.

In an example, in a first configuration a transflective mirror can retract out of a person's field of view and in a second configuration the transflective mirror can extend into the person's field of view. In an example, in the first configuration the transflective mirror can be retracted into a portion of an eyewear frame and in the second configuration the transflective mirror can extend out from the frame into the person's field of view. In another example, in a first configuration a transflective mirror can be in a peripheral area of a person's field of view (e.g. an upper-outer portion of a lens in front of an eye) and in a second configuration the transflective mirror can move into a central portion of the person's field of view (e.g. the center of the lens). In an example, the transflective mirror can be moved from its first configuration to its second configuration by pivoting, rotating, sliding, unrolling, unfolding, and/or telescoping.

People do not go about their daily lives with a phone or smart watch permanently strapped in front of their eyes. (It may seem like some go around glued to their phones, but not literally.) Instead, people generally remain visually-engaged with their environment most of the time and only look at the display of a phone or smart watch at particular times when they want to see the virtual information which it displays. In an analogous manner, it is useful to have adjustable-mode augmented reality eyewear so that the wearer can see their environment clearly (e.g. undistorted, wide-angle view) most of the time and only display virtual objects in a prominent area of their field of view when they desire to see them. The adjustable-mode augmented reality eyewear which is disclosed herein provides people with this capability.

BRIEF INTRODUCTION TO THE FIGURES

DETAILED DESCRIPTION OF THE FIGURES

Figure 1:
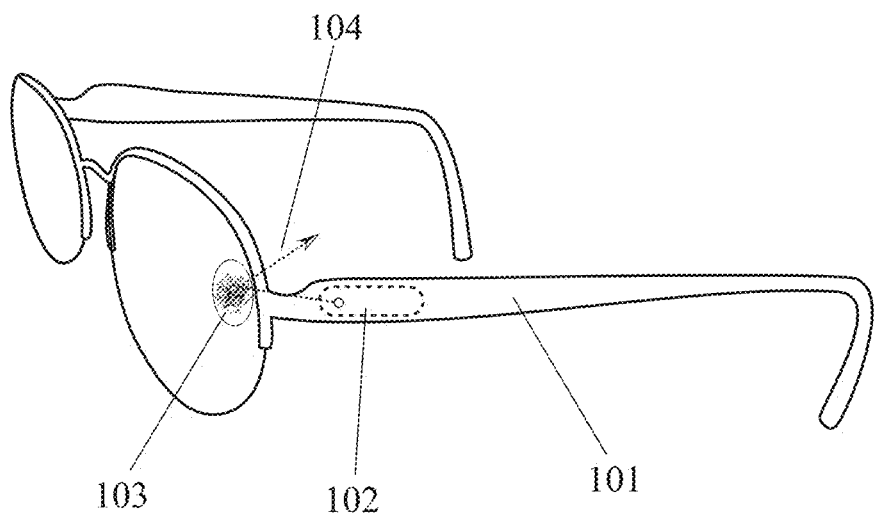
FIG. 1 shows an example of augmented reality eyewear with a transflective mirror which is moved from a peripheral location to a central location in a person's field of view.
Figure 1:
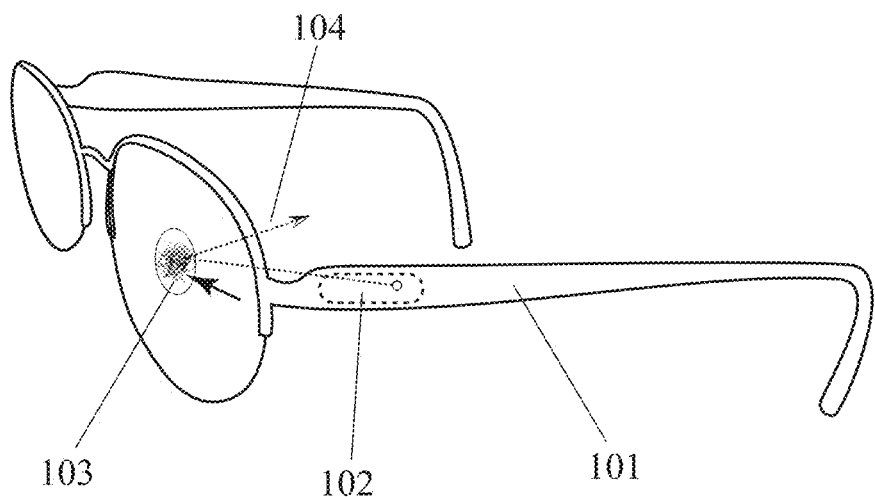
Figure 2:
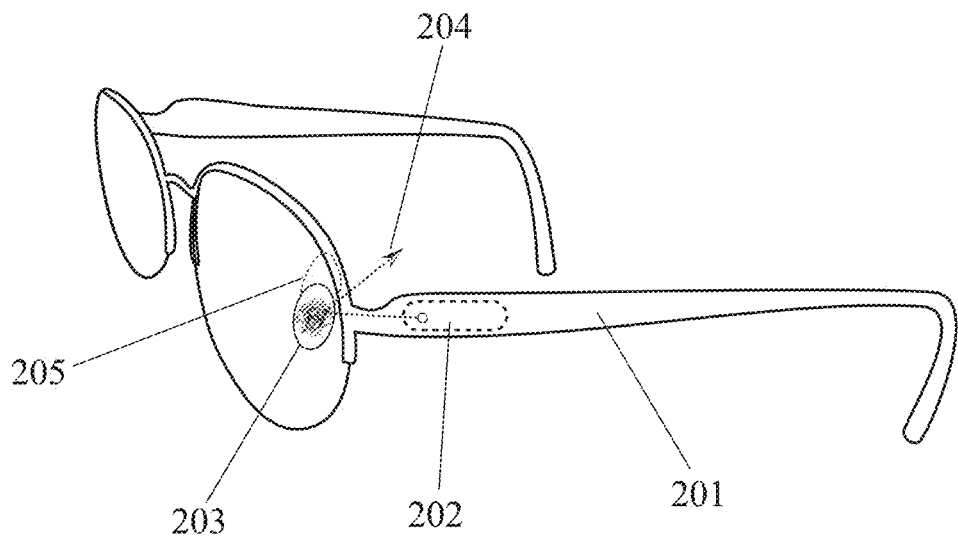
FIG. 2 shows an example of augmented reality eyewear with a transflective mirror which is moved from a peripheral location to a central location in a person's field of view by sliding an arm to which the mirror is attached.
Figure 2:
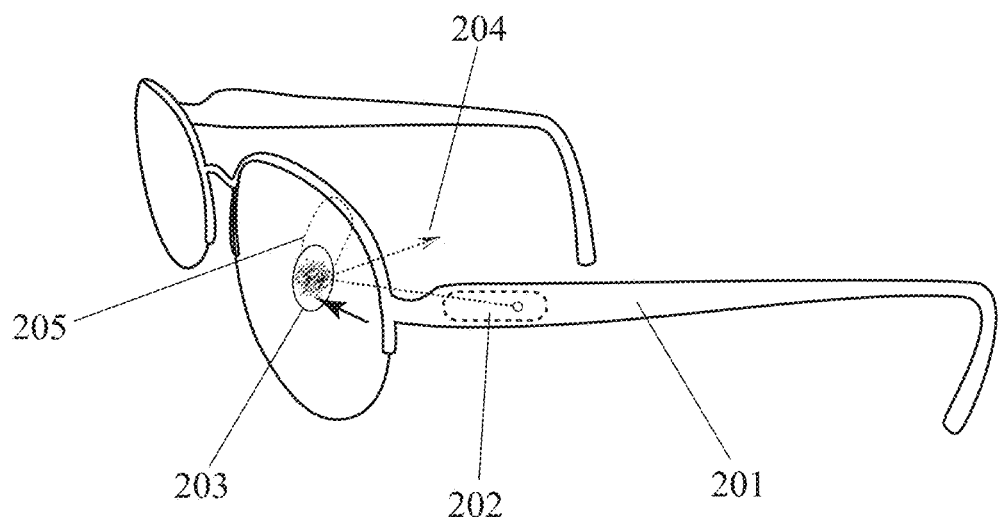
Figure 3:
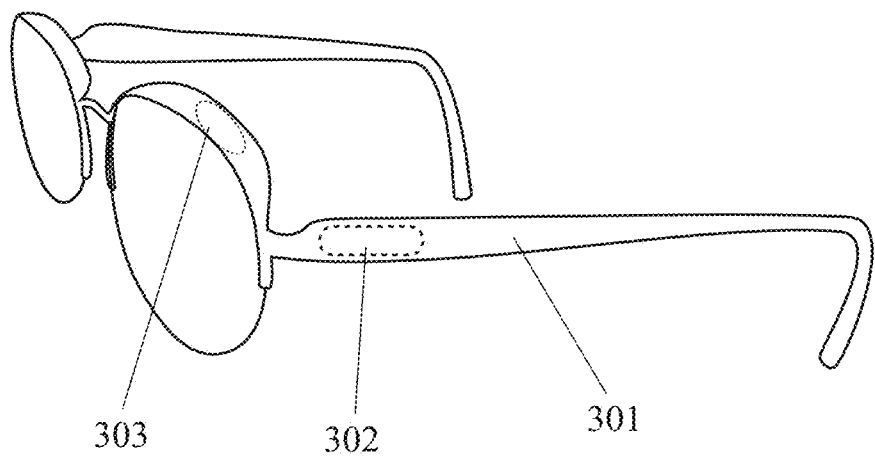
FIG. 3 shows an example of augmented reality eyewear with a transflective mirror which can be retracted into the eyewear frame or extended out into a person's field of view.
Figure 3:
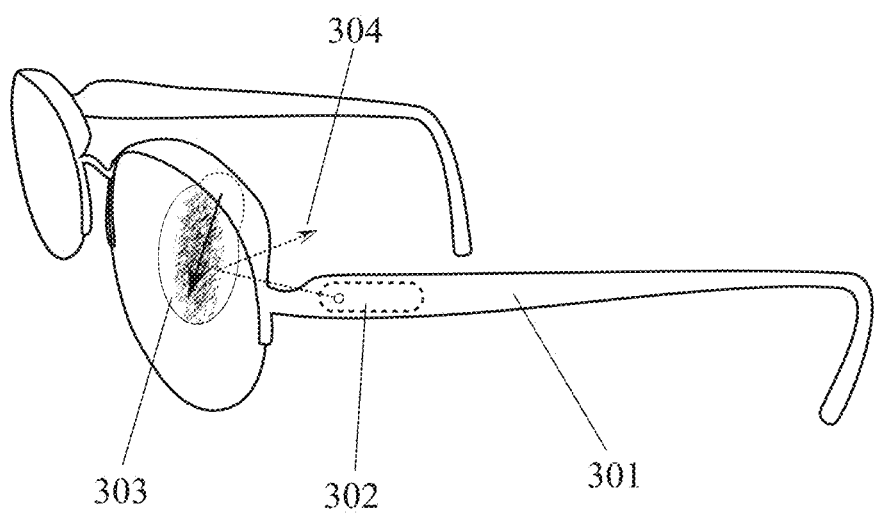

Before discussing the specific embodiments of this invention which are shown in FIGS. 1 through 3, this disclosure provides an introductory section which covers the general concepts, components, and methods which comprise this invention. Where relevant, these concepts, components, and methods can be applied as variations to the examples shown in FIGS. 1 through 3 which are discussed afterwards.

In an example, augmented reality eyewear can comprise: an eyewear frame which is configured to be worn by a person; a display on the eyewear frame; and a transflective mirror, wherein the transflective mirror partly transmits light and partly reflects light, wherein the transflective mirror has a first configuration in a first location, wherein the transflective mirror has a second configuration in a second location, wherein the second location is closer to the center of the person's field of view than the first location, wherein the transflective mirror is moved from its first configuration to its second configuration, and wherein light from the display is reflected by the transflective mirror to display a virtual object in the person's field of view when the transflective mirror is in the second configuration.

In an example, the display can be on a sidepiece or temple of the eyewear frame and light rays from the display can be reflected by the transflective mirror toward the person's eye. In an example, the eyewear can include a second transflective mirror, wherein the second transflective mirror is farther away from the person's eye than the first transflective mirror, and wherein the first transflective mirror, the second transflective mirror, or both mirrors are moved when the eyewear is changed from the first configuration to the second configuration. In an example, light rays from the display can be reflected by the first transflective mirror toward the second transflective mirror and then reflected by the second transflective mirror toward the person's eye.

In an example, the second location can be closer to a center of the person's field of view or a center of an optical lens than the first location. In an example, the second location can be in a central portion of the person's field of view or an optical lens and the first location can be in a peripheral portion of the person's field of view or an optical lens. In an example, the distance between the first location and the second location can be at least one half inch. In an example, the transflective mirror can have a centroid and the distance between the centroid of the mirror in the first location and the centroid of the mirror in the second location can be at least one half inch.

In an example, the eyewear can further comprise a track, channel, or groove on the eyewear frame or an optical lens, wherein the transflective mirror is moved from the first configuration to the second configuration by being slid or otherwise moved along the track, channel, or groove. In an example, the eyewear can further comprise a movable joint or axle between the transflective mirror and the eyewear frame or an optical lens, wherein the transflective mirror is moved from the first configuration to the second configuration by being pivoted or rotated around this joint or axle.

In an example, the eyewear can be changed from the first configuration to the second configuration by unfolding, unrolling, or telescopically-extending the transflective mirror. In an example, transflective mirror can comprise a plurality of partially-reflective sections which are not coplanar in the first configuration and are coplanar in the second configuration. In an example, the eyewear can further comprise a movable arm, wherein the transflective mirror is part of the movable arm or is attached to the movable arm, and wherein the transflective mirror is moved from the first configuration to the second configuration by pivoting or rotating the arm. In an example, the eyewear can further comprise a wheel, wherein the transflective mirror is part of the wheel or is attached to the wheel, and wherein the transflective mirror is moved from the first configuration to the second configuration by rotating the wheel.

In an example, the transflective mirror can be retracted out from the person's field of view in the first configuration and extend into the person's field of view in the second configuration. In an example, there can be a recess, opening, or compartment in the eyewear frame, wherein the transflective mirror is retracted into the recess, opening, or compartment in the first configuration and extended out from the recess, opening, or compartment in the second configuration. In an example, the recess, opening, or compartment can be in the front piece of the eyewear frame. In an example, the recess, opening, or compartment can be in the front piece of the eyewear frame above an optical lens. In an example, the recess, opening, or compartment can be in the front piece of the eyewear frame to one side of an optical lens.

In an example, a method of adjusting the display mode of augmented reality eyewear can comprise: moving a transflective mirror from a first location to a second location in front of the person's eye, wherein the transflective mirror reflects light from a display toward a person's eye in order to display a virtual object in the person's field of view when the transflective mirror is on the second location.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration in a first location, wherein the transflective mirror has a second configuration in a second location, wherein the second location is closer to the center of the person's field of view than the first location, wherein the transflective mirror is moved from its first configuration to its second configuration, and wherein light from the display is reflected by the transflective mirror to display a virtual object in the person's field of view when the transflective mirror is in the second configuration.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration which reflects light from the display in a first area in the person's field of view, wherein the transflective mirror has a second configuration which reflects light from the display in a second area in the person's field of view, wherein the transflective mirror is moved (e.g. manually or by an actuator) from its first configuration to its second configuration, wherein the second area is closer to the center of the person's field of view than the first area, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and an axle (e.g. moveable joint) which connects the transflective mirror (or a moving arm which holds the transflective mirror) to the eyewear frame, wherein the transflective mirror has a first configuration which reflects light from the display in a first area in the person's field of view, wherein the transflective mirror has a second configuration which reflects light from the display in a second area in the person's field of view, wherein the transflective mirror is moved (e.g. manually or by an actuator) from its first configuration to its second configuration by being pivoted and/or rotated around the axle, wherein the second area is closer to the center of the person's field of view than the first area, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a lens (e.g. substantially-transparent component); and a transflective mirror (e.g. partly-reflective and partly-transmissive optical component), wherein the transflective mirror has a first configuration which reflects light from the display in a first area in the person's field of view, wherein the transflective mirror has a second configuration which reflects light from the display in a second area in the person's field of view, wherein the transflective mirror is changed from its first configuration to its second configuration by being moved (e.g. manually or by an actuator) in a virtual plane which is substantially parallel to the lens, wherein the second area is closer to the center of the person's field of view than the first area, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration which reflects light from the display in a first area in the person's field of view, wherein the transflective mirror has a second configuration which reflects light from the display in a second area in the person's field of view, wherein the transflective mirror is slid (e.g. manually or by an actuator) from its first configuration to its second configuration, wherein the second area is closer to the center of the person's field of view than the first area, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and a track along which the transflective mirror moves; wherein the transflective mirror has a first configuration which reflects light from the display in a first area in the person's field of view, wherein the transflective mirror has a second configuration which reflects light from the display in a second area in the person's field of view, wherein the transflective mirror is moved (e.g. manually or by an actuator) along the track from its first configuration to its second configuration, wherein the second area is closer to the center of the person's field of view than the first area, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration which reflects light from the display in a first area which is in the periphery of the person's field of view (e.g. in the outermost of three concentric circles with radii of 1×, 2×, and 3×, respectively), wherein the transflective mirror has a second configuration which reflects light from the display in a second area which is in the center of the person's field of view (e.g. in the innermost of three concentric circles with radii of 1×, 2×, and 3×, respectively), wherein the transflective mirror is moved (e.g. manually or by an actuator) from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration which reflects light from the display in a first area which is in the periphery of the person's field of view (e.g. in the outer of two concentric circles with radii of 1× and 2×, respectively), wherein the transflective mirror has a second configuration which reflects light from the display in a second area which is in the center of the person's field of view (e.g. in the inner of two concentric circles with radii of 1× and 2×, respectively), wherein the transflective mirror is moved (e.g. manually or by an actuator) from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a movable arm or wheel; a joint or axle which connects the arm or wheel to the frame; and a transflective mirror (e.g. partly-reflective and partly-transmissive optical component) which is part of (or attached to) the arm or wheel, wherein light from the display which is reflected by the mirror shows a virtual object in the person's field of view, wherein the mirror has a first configuration at a first location in the person's field of view, wherein the mirror has a second configuration at a second location in the person's field of view, and wherein the mirror is moved from the first configuration to the second configuration by movement of the arm or wheel.

In an example, augmented reality eyewear can comprise: an eyewear frame which is worn by a person; a display (e.g. a plurality of light-emitting elements which display an image) on the eyewear frame; a movable arm or wheel; a joint or axle which connects the arm or wheel to the frame; and a transflective mirror (e.g. partly-reflective and partly-transmissive optical component) which is part of (or attached to) the arm or wheel, wherein light from the display which is reflected by the mirror shows a virtual object in the person's field of view, wherein the mirror has a first configuration at a first location in the person's field of view, wherein the mirror has a second configuration at a second location in the person's field of view, wherein the mirror is moved from the first configuration to the second configuration by movement of the arm or wheel, and wherein the second location is closer to the center of the person's field of view than the first location.

In an example, augmented reality eyewear can have a first configuration in which a transflective mirror is in a first location in a person's field of view and a second configuration in which the mirror is in a second location in the person's field of view, wherein the mirror is moved from the first location to the second location, and wherein the second location is closer to the center of the person's field of view than the first location. In an example, augmented reality eyewear can include a lens and a transflective mirror, wherein the transflective mirror can be moved (e.g. pivoted, rotated, or slid) from a first location relative to the lens to a second location relative to the lens, wherein the second location is more central to the person's field of view than the first location. In an example, augmented reality eyewear can include a lens and a transflective mirror, wherein the transflective mirror can be moved (e.g. pivoted, rotated, or slid) from a first location in front of the lens to a second location in front of the lens, wherein the second location is more central to the person's field of view than the first location.

In an example, augmented reality eyewear can include a lens and a transflective mirror, wherein the transflective mirror can be moved (e.g. pivoted, rotated, or slid) from a first location in front of the lens to a second location in front of the lens. In an example, augmented reality eyewear can comprise a lens and a movable transflective mirror, wherein the mirror is substantially parallel to the lens. In an example, augmented reality eyewear can comprise a lens and a movable transflective mirror, wherein the mirror is substantially parallel to the lens in a first configuration and at an acute angle with respect to the lens in a second configuration.

In an example, augmented reality eyewear can comprise a lens and a movable transflective mirror, wherein the mirror is a first distance from the lens in a first configuration and a second distance from the lens in a second configuration. In an example, augmented reality eyewear can comprise a lens and a movable transflective mirror, wherein the mirror does not overlap the lens in a first configuration and does overlap the lens in a second configuration. In an example, augmented reality eyewear can comprise a lens and a movable transflective mirror, wherein the mirror is not in optical communication with the lens in a first configuration and is in optical communication with the lens in a second configuration.

In an example, augmented reality eyewear can comprise: an eyewear frame which is worn by a person; a display (e.g. a plurality of light-emitting elements which display an image) on the eyewear frame; a lens (e.g. substantially-transparent component); and a transflective mirror (e.g. partly-reflective and partly-transmissive optical component); wherein the transflective mirror has a first configuration in front of a first quadrant of the lens (or in a first quadrant of the person's field of view), wherein the transflective mirror has a second configuration in front of a second quadrant of the lens (or in a second quadrant of the person's field of view), wherein the transflective mirror is moved (e.g. manually or by an actuator) from its first configuration to its second configuration, and wherein light from the display is reflected by the transflective mirror and displays a virtual object in the person's field of view.

In an example, an outer quadrant of a lens or a person's field of view is farther away from the person's nose than an inner quadrant of the lens or the person's field of view. In an example, an upper quadrant of a lens or a person's field of view is closer to the top of a person's head than a lower quadrant of the lens or the person's field of view.

In an example, augmented reality eyewear can comprise: an eyewear frame which is worn by a person; a display (e.g. a plurality of light-emitting elements which display an image) on the eyewear frame; a lens (e.g. substantially-transparent component); and a transflective mirror (e.g. partly-reflective and partly-transmissive optical component); wherein the transflective mirror has a first configuration in front of a lower-outer quadrant of the lens, wherein the transflective mirror has a second configuration in front of a central area (e.g. a central third) of the lens, wherein the transflective mirror is moved (e.g. manually or by an actuator) from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a lens (e.g. substantially-transparent component); and a transflective mirror (e.g. partly-reflective and partly-transmissive optical component); wherein the transflective mirror has a first configuration in front of a upper-outer quadrant of the lens, wherein the transflective mirror has a second configuration in front of a central area (e.g. a central third) of the lens, wherein the transflective mirror is moved (e.g. manually or by an actuator) from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration in a first quadrant of the person's field of view, wherein the transflective mirror has a second configuration in a second quadrant of the person's field of view, wherein the transflective mirror is moved (e.g. manually or by an actuator) from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration in a lower-outer quadrant of the person's field of view, wherein the transflective mirror has a second configuration in a central portion (e.g. central third) of the person's field of view, wherein the transflective mirror is moved (e.g. manually or by an actuator) from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration in an upper-outer quadrant of the person's field of view, wherein the transflective mirror has a second configuration in a central portion (e.g. central third) of the person's field of view, wherein the transflective mirror is moved (e.g. manually or by an actuator) from its first configuration to its second configuration, and wherein light from the display is reflected by the transflective mirror and displays a virtual object in the person's field of view.

In an example, a transflective mirror can be changed from its first configuration to its second configuration by unfolding or folding. In an example, augmented reality eyewear worn can include a transflective mirror with a first (retracted) configuration in which it is folded into a recess or compartment in the eyewear frame and a second (extended) configuration in which it is unfolded out of the frame in front of a person's eye and/or a lens, wherein in the second (extended) configuration reflected light from the mirror displays a virtual object in the person's field of view. In an example, augmented reality eyewear can comprise a transflective mirror, wherein the mirror has a first configuration in which it is folded into a recess or compartment in an eyewear frame and wherein the mirror has a second configuration in which it is unfolded out of the recess or compartment.

In an example, a transflective mirror can be changed from its first configuration to its second configuration by pivoting or rotation. In an example, augmented reality eyewear can have a first configuration in which a transflective mirror is in a first location in a person's field of view and a second configuration in which the mirror is in a second location in the person's field of view, wherein the mirror is pivoted or rotated horizontally from the first location to the second location. In an example, augmented reality eyewear can have a first configuration in which a transflective mirror is in a first location in a person's field of view and a second configuration in which the mirror is in a second location in the person's field of view, wherein the mirror is pivoted or rotated vertically from the first location to the second location.

In an example, a transflective mirror can be changed from its first configuration to its second configuration by unrolling or rolling. In an example, a transflective mirror can be changed from its first configuration to its second configuration by uncoiling or coiling. In an example, a transflective mirror can be changed from its first configuration to its second configuration by un-scrolling or scrolling. In an example, augmented reality eyewear can include a transflective mirror with a first (retracted) configuration in which it is rolled and/or coiled into a recess or compartment in an eyewear frame and a second (extended) configuration in which it is unrolled and/or uncoiled out in front of a person's eye and/or a lens, wherein in the second (extended) configuration reflected light from the mirror displays a virtual object in the person's field of view. In an example, augmented reality eyewear can comprise a transflective mirror, wherein the mirror has a first configuration in which it is rolled or scrolled into a recess or compartment in an eyewear frame and wherein the mirror has a second configuration in which it is unrolled, un-scrolled, or uncoiled out of the recess or compartment.

In an example, a transflective mirror can be changed from its first configuration to its second configuration by sliding. In an example, augmented reality eyewear can comprise a transflective mirror, wherein the mirror has a first configuration in which it is slid into a recess or compartment in an eyewear frame and wherein the mirror has a second configuration in which it is slid out of the recess or compartment. In an example, augmented reality eyewear can have a first configuration in which a transflective mirror is in a first location in a person's field of view and a second configuration in which the mirror is in a second location in the person's field of view, wherein the mirror is slid horizontally from the first location to the second location. In an example, augmented reality eyewear can have a first configuration in which a transflective mirror is in a first location in a person's field of view and a second configuration in which the mirror is in a second location in the person's field of view, wherein the mirror is slid vertically from the first location to the second location.

In an example, a transflective mirror can be changed from its first configuration to its second configuration by telescoping. In an example, augmented reality eyewear can include a transflective mirror with a first (retracted) configuration in which it is telescopically-contracted into a recess or compartment in the eyewear frame and a second (extended) configuration in which it is telescopically-extended out in front of a person's eye and/or a lens, wherein in the second (extended) configuration reflected light from the mirror displays a virtual object in the person's field of view. In an example, augmented reality eyewear can comprise a transflective mirror, wherein the mirror has a first configuration in which it is telescopically-retracted into a recess or compartment in an eyewear frame and wherein the mirror has a second configuration in which it is telescopically-extended out of the recess or compartment.

In an example, a transflective mirror can be moved from a first configuration and a second configuration, or vice versa, by a mechanism selected from the group consisting of: sliding the transflective mirror; pivoting or rotating the transflective mirror; folding or unfolding the transflective mirror, extending the transflective mirror, unrolling or rolling the transflective mirror; uncoiling or coiling the transflective mirror; and telescopically-extending or telescopically-contracting the transflective mirror. In an example, augmented reality eyewear can include a movable articulated structure which holds a transflective mirror, wherein the structure has a retracted configuration and an extended configuration, and wherein the mirror is closer to the center of the person's field of view when the structure is in the extended configuration.

In an example, a transflective mirror can be moved from a first configuration and a second configuration, or vice versa, by a mechanism selected from the group consisting of: sliding an arm or wheel holding the transflective mirror; pivoting or rotating an arm or wheel holding the transflective mirror; folding or unfolding an arm or wheel holding the transflective mirror, extending an arm or wheel holding the transflective mirror, unrolling or rolling an arm or wheel holding the transflective mirror; uncoiling or coiling an arm or wheel holding the transflective mirror; and telescopically-extending or telescopically-contracting an arm or wheel holding the transflective mirror.

In an example, augmented reality eyewear worn by a person can have a first configuration which provides a clear, undistorted, and undimmed view of the person's environment and a second configuration which shows on or more virtual objects superimposed on the environment, wherein the eyewear has a transflective mirror which is retracted out of the person's field of view in the first configuration and extends into the person's field of view in the second configuration, and wherein the transflective mirror is pivoted, rotated, or slid from the first configuration to the second configuration. In an example, augmented reality eyewear worn by a person can have a first configuration which provides a clear, undistorted, and undimmed view of the person's environment and a second configuration which displays one or more virtual objects superimposed on the environment in the person's field of view, wherein the eyewear has a transflective mirror which is retracted out of the person's field of view in the first configuration and extends into the person's field of view in the second configuration, and wherein the transflective mirror is unrolled or unfolded from the first configuration to the second configuration.

In an example, augmented reality eyewear can include a lens and a transflective mirror, wherein the transflective mirror can be moved (e.g. pivoted, rotated, or slid) from a first location on the lens to a second location on the lens. In an example, augmented reality eyewear can include a lens with three horizontal sections (e.g. like a trifocal lens), wherein one of the three sections includes a transflective mirror, and wherein the transflective mirror can be moved (e.g. pivoted, rotated, or slid) from a first location on the lens to a second location on the lens. In an example, augmented reality eyewear can include a lens with (nested and/or concentric) rings, wherein one of the rings includes a transflective mirror, and wherein the transflective mirror can be moved from a first location on the lens to a second location on the lens by rotating that ring.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and an axle (e.g. moveable joint) which connects the transflective mirror (or a moving arm which holds the transflective mirror) to the eyewear frame, wherein the transflective mirror has a first configuration which reflects light from the display in a first area in the person's field of view, wherein the transflective mirror has a second configuration which reflects light from the display in a second area in the person's field of view, wherein the transflective mirror is moved (e.g. manually or by an actuator) from its first configuration to its second configuration by being pivoted and/or rotated around the axle, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a lens (e.g. substantially-transparent component); and a transflective mirror (e.g. partly-reflective and partly-transmissive optical component), wherein the transflective mirror has a first configuration which reflects light from the display in a first area in the person's field of view, wherein the transflective mirror has a second configuration which reflects light from the display in a second area in the person's field of view, wherein the transflective mirror is changed from its first configuration to its second configuration by being moved along a virtual plane which is substantially parallel to the lens, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a movable arm or wheel; a joint or axle which connects the arm or wheel to the frame; and a transflective mirror (e.g. partly-reflective and partly-transmissive optical component) which is part of or attached to the arm or wheel, wherein light from the display which is reflected by the mirror shows a virtual object in the person's field of view, wherein the mirror has a first configuration at a first location in the person's field of view, wherein the mirror has a second configuration at a second location in the person's field of view, and wherein the mirror is moved from the first configuration to the second configuration when the arm or wheel pivots or rotates around the joint or axle.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration which reflects light from the display in a first area in the person's field of view, wherein the transflective mirror has a second configuration which reflects light from the display in a second area in the person's field of view, wherein the transflective mirror is slid horizontally from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration which reflects light from the display in a first area in the person's field of view, wherein the transflective mirror has a second configuration which reflects light from the display in a second area in the person's field of view, wherein the transflective mirror is slid vertically from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and a diagonal track (between vertical and horizontal)

along which the transflective mirror moves, wherein the transflective mirror has a first configuration at a first location, wherein the transflective mirror has a second configuration at a second location, wherein the transflective mirror is moved (e.g. manually or by an actuator) from its first configuration to its second configuration by moving along the diagonal track, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration at a first location, wherein the transflective mirror has a second configuration at a second location, wherein the transflective mirror is moved (e.g. manually or by an actuator) from its first configuration to its second configuration along a diagonal vector between a vertical vector and a horizontal vector (e.g. a diagonal vector from a point in the upper-outer portion of the person's field of vision to a point in the lower-inner of the person's field of vision), and wherein light from the display is reflected by the transflective mirror and displays a virtual object in the person's field of view.

In an example, augmented reality eyewear can have a lens with a transparent horizontal track along which a transflective mirror can slide in order to display virtual objects from different locations on the lens. In an example, augmented reality eyewear can have a lens with a transparent vertical track along which a transflective mirror can slide in order to display virtual objects from different locations on the lens. In an example, augmented reality eyewear can have a lens with a transparent diagonal (e.g. between horizontal and vertical) track along which a transflective mirror can slide in order to display virtual objects from different locations on the lens.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and a track along which the transflective mirror moves; wherein the transflective mirror has a first configuration which reflects light from the display in a first area in the person's field of view, wherein the transflective mirror has a second configuration which reflects light from the display in a second area in the person's field of view, wherein the transflective mirror is moved along the track from its first configuration to its second configuration, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and a horizontal track along which the transflective mirror moves, wherein the transflective mirror has a first configuration at a first location, wherein the transflective mirror has a second configuration at a second location, wherein the transflective mirror is moved (e.g. manually or by an actuator) from its first configuration to its second configuration by moving along the horizontal track, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and a vertical track along which the transflective mirror moves, wherein the transflective mirror has a first configuration at a first location, wherein the transflective mirror has a second configuration at a second location, wherein the transflective mirror is moved (e.g. manually or by an actuator) from its first configuration to its second configuration by moving along the vertical track, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration at a first location, wherein the transflective mirror has a second configuration at a second location, wherein the transflective mirror is moved (e.g. manually or by an actuator) from its first configuration to its second configuration along a horizontal vector, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration at a first location, wherein the transflective mirror has a second configuration at a second location, wherein the transflective mirror is moved (e.g. manually or by an actuator) from its first configuration to its second configuration along a vertical vector, and wherein light from the display is reflected by the transflective mirror and displays a virtual object in the person's field of view.

In an example, augmented reality eyewear can include a movable transparent arm which holds a transflective mirror in front of a lens, wherein pivoting and/or rotating the arm causes the transflective mirror to move to different locations in front of the lens, thereby display virtual objects from different locations on the lens. In an example, augmented reality eyewear can comprise: a movable arm which pivots or rotates around a joint or axle located on the front piece of the eyewear frame in an upper-inner quadrant (above the eye and toward the nose) of a person's field of view from an eye; and a transflective mirror is part of or attached to the arm.

In an example, augmented reality eyewear can comprise: a movable arm which pivots or rotates around a joint or axle located on the front piece of the eyewear frame in an upper-outer quadrant (above the eye and away from the nose) of a person's field of view from an eye; and a transflective mirror is part of or attached to the arm. In an example, augmented reality eyewear can comprise a pivoting arm which holds a transflective mirror in place, wherein the pivoting arm can be pivoted upward around an axle (or movable joint) into the front piece of the eyewear or pivoted downward around the axle (or movable joint) to be front of a person's eye and/or eyewear lens, wherein the axle (or movable joint) is on the front piece of the eyewear.

In an example, augmented reality eyewear can comprise a pivoting arm which holds a transflective mirror in place, wherein the pivoting arm can be pivoted upward into the front piece of the eyewear or pivoted downward in front of a person's eye and/or eyewear lens. In an example, augmented reality eyewear can comprise a pivoting arm which holds a transflective mirror in place, wherein the pivoting arm can be pivoted upward around an axle (or movable joint) into the front piece of the eyewear or pivoted downward around the axle (or movable joint) to be front of a person's eye and/or eyewear lens. In an example, augmented reality eyewear can have a hinged and/or pivoting arm to which a transflective mirror is attached, wherein the arm has a first configuration which is parallel to the sidepiece (e.g. temple) of the eyewear frame and a second configuration which is parallel to a lens in front of an eye.

In an example, augmented reality eyewear can include a movable transparent arm which is attached to the eyewear frame by an axle or moveable joint, wherein the arm holds a transflective mirror in front of a lens, and wherein pivoting and/or rotating the arm causes the transflective mirror to move to different locations in front of the lens, thereby displaying virtual objects from different locations on the lens. In an example, augmented reality eyewear can include a movable transparent arm which is attached to the eyewear frame by an axle or moveable joint above a lens, wherein the arm holds a transflective mirror in front of the lens, and wherein pivoting and/or rotating the arm causes the transflective mirror to move to different locations in front of the lens, thereby displaying virtual objects from different locations on the lens.

In an example, augmented reality eyewear can include a transparent wheel which holds a transflective mirror in front of a lens, wherein pivoting and/or rotating the wheel causes the transflective mirror to move to different locations in front of the lens, thereby display virtual objects from different locations on the lens. In an example, augmented reality eyewear can include a transparent wheel which is attached to the eyewear frame by an axle, wherein the wheel holds a transflective mirror in front of a lens, and wherein pivoting and/or rotating the arm causes the transflective mirror to move to different locations in front of the lens, thereby display virtual objects from different locations on the lens. In an example, augmented reality eyewear can include a transparent wheel which is attached to the eyewear frame by an axle above a lens, wherein the wheel holds a transflective mirror in front of the lens, and wherein pivoting and/or rotating the arm causes the transflective mirror to move to different locations in front of the lens, thereby display virtual objects from different locations on the lens.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration which reflects light from the display in a first area in the person's field of view, wherein the transflective mirror has a second configuration which reflects light from the display in a second area in the person's field of view, wherein the transflective mirror is moved (e.g. manually or by an actuator) from its first configuration to its second configuration, wherein the center of the second area is between ½ and 3 inches away from the center of the first area, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration which reflects light from the display in a first area in the person's field of view, wherein the transflective mirror has a second configuration which reflects light from the display in a second area in the person's field of view, wherein the transflective mirror is moved (e.g. manually or by an actuator) from its first configuration to its second configuration, wherein the second area is at least 25% larger than the first area, and wherein light from the display is reflected by the transflective mirror and displays a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component); wherein the transflective mirror has a first configuration which reflects light from the display in a first area in the person's field of view, wherein the transflective mirror has a second configuration which reflects light from the display in a second area in the person's field of view, wherein the transflective mirror is moved (e.g. manually or by an actuator) from its first configuration to its second configuration, wherein the second area has a different shape than the first area, and wherein light from the display is reflected by the transflective mirror and displays a virtual object in the person's field of view.

In an example, a method of adjusting the display mode of augmented reality eyewear can comprise: moving a transflective mirror (e.g. partly-reflective and partly-transmissive optical component) from a first location in front of a person's eye to a second location in front of the person's eye, wherein the transflective mirror reflects light from a display (e.g. a plurality of light-emitting elements) in order to display a virtual object in the person's field of view. In an example, a method of adjusting the display mode of augmented reality eyewear can comprise: pivoting and/or rotating a transflective mirror (e.g. partly-reflective and partly-transmissive optical component) from a first location in front of a person's eye to a second location in front of the person's eye, wherein the transflective mirror reflects light from a display (e.g. a plurality of light-emitting elements) in order to display a virtual object in the person's field of view.

In an example, a method of adjusting the display mode of augmented reality eyewear can comprise: pivoting and/or rotating an arm holding a transflective mirror (e.g. partly-reflective and partly-transmissive optical component) from a first location in front of a person's eye to a second location in front of the person's eye, wherein the transflective mirror reflects light from a display (e.g. a plurality of light-emitting elements) in order to display a virtual object in the person's field of view. In an example, a method of adjusting the display mode of augmented reality eyewear can comprise: pivoting and/or rotating an arm holding a transflective mirror (e.g. partly-reflective and partly-transmissive optical component) around an axle from a first location in front of a person's eye to a second location in front of the person's eye, wherein the transflective mirror reflects light from a display (e.g. a plurality of light-emitting elements) in order to display a virtual object in the person's field of view.

In an example, a method of adjusting the display mode of augmented reality eyewear can comprise: pivoting and/or rotating a transflective mirror (e.g. partly-reflective and partly-transmissive optical component) around an axle from a first location in front of a person's eye to a second location in front of the person's eye, wherein the transflective mirror reflects light from a display (e.g. a plurality of light-emitting elements) in order to display a virtual object in the person's field of view. In an example, a method of adjusting the display mode of augmented reality eyewear can comprise: sliding a transflective mirror (e.g. partly-reflective and partly-transmissive optical component) from a first location in front of a person's eye to a second location in front of the person's eye, wherein the transflective mirror reflects light from a display (e.g. a plurality of light-emitting elements) in order to display a virtual object in the person's field of view.

In an example, a method of adjusting the display mode of augmented reality eyewear can comprise: telescopically-extending a transflective mirror (e.g. partly-reflective and partly-transmissive optical component) from a first location in front of a person's eye to a second location in front of the person's eye, wherein the transflective mirror reflects light from a display (e.g. a plurality of light-emitting elements) in order to display a virtual object in the person's field of view. In an example, a method of adjusting the display mode of augmented reality eyewear can comprise: unfolding a transflective mirror (e.g. partly-reflective and partly-transmissive optical component) from a first location in front of a person's eye to a second location in front of the person's eye, wherein the transflective mirror reflects light from a display (e.g. a plurality of light-emitting elements) in order to display a virtual object in the person's field of view. In an example, a method of adjusting the display mode of augmented reality eyewear can comprise: unrolling and/or un-scrolling a transflective mirror (e.g. partly-reflective and partly-transmissive optical component) from a first location in front of a person's eye to a second location in front of the person's eye, wherein the transflective mirror reflects light from a display (e.g. a plurality of light-emitting elements) in order to display a virtual object in the person's field of view.

In an example, augmented reality eyewear worn by a person can have a first configuration which provides a clear, undistorted, and undimmed view of the person's environment and a second configuration which shows on or more virtual objects superimposed on the environment, wherein the eyewear has a transflective mirror which is retracted out of the person's field of view in the first configuration and extends into the person's field of view in the second configuration. In an example, augmented reality eyewear can comprise a transflective mirror, wherein the mirror has a first configuration in which it is retracted into a recess or compartment in an eyewear frame and wherein the mirror has a second configuration in which it is extended out of the recess or compartment.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is retracted into the eyewear frame, wherein the transflective mirror has an extended configuration in which the transflective mirror is extended out from the eyewear frame into the person's field of view, wherein the transflective mirror is moved (e.g. manually or by an actuator) from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is retracted upwards into the eyewear frame, wherein the transflective mirror has an extended configuration in which the transflective mirror is extended downward from the eyewear frame into the person's field of view, wherein the transflective mirror is moved (e.g. manually or by an actuator) from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is pivoted or rotated upwards out of the person's field of view, wherein the transflective mirror has an extended configuration in which the transflective mirror is pivoted or rotated downward into the person's field of view, wherein the transflective mirror is pivoted or rotated from the retracted configuration to the extended configuration, and wherein light from the display is reflected by the transflective mirror in the extended configuration to display a virtual object in the person's field of view.

In an example, there can be a recess and/or compartment in a portion of an eyewear frame which is located over a person's eye and/or a lens in front of the eye, wherein the eyewear has a first configuration in which a transflective mirror is retracted up into the recess and/or compartment and a second configuration in which the transflective mirror extends out from the recess and/or compartment in front of the eye or lens. In an example, there can be a recess, opening, and/or compartment in the front piece of the frame of augmented reality eyewear (above a person's eye) into which a transflective mirror can be retracted to provide a clear, undistorted, and undimmed view of a person's environment and from which the transflective mirror can be extended to display one or more virtual objects superimposed on the environment in the person's field of view.

In an example, there can be a recess, opening, and/or compartment in the sidepiece (e.g. temple) of the frame of augmented reality eyewear into which a transflective mirror can be retracted to provide a clear, undistorted, and undimmed view of a person's environment and from which the transflective mirror can be extended to display one or more virtual objects superimposed on the environment in the person's field of view. In an example, augmented reality eyewear can include a movable articulated structure which holds a transflective mirror, wherein the structure has a retracted configuration and an extended configuration.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is retracted upwards out of the person's field of view, wherein the transflective mirror has an extended configuration in which the transflective mirror is extended downward into the person's field of view, wherein the transflective mirror is moved (e.g. manually or by an actuator) from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the mirror is retracted out of the person's field of view, wherein the transflective mirror has an extended configuration in which the mirror is extended into the person's field of view, wherein the mirror is moved from the retracted configuration to the extended configuration, and wherein light from the display is reflected by the mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which at least two-thirds of the mirror is retracted out of the person's field of view, wherein the transflective mirror has an extended configuration in which at least two-thirds of the mirror is extended into the person's field of view, wherein the mirror is moved from the retracted configuration to the extended configuration, and wherein light from the display is reflected by the mirror in the extended configuration to display a virtual object in the person's field of view.

In an example, augmented reality eyewear can comprise: an eyewear frame which is worn by a person; a lens (e.g. a substantially-transparent component) on the eyewear frame which is configured to be positioned in front of the person's eye; a display (e.g. a plurality of light-emitting elements which display an image) on the eyewear frame; and a transflective mirror (e.g. partly-reflective and partly-transmissive optical component), wherein the eyewear has a retracted configuration in which the transflective mirror does not span (e.g. span, cover, fill, or overlap) the person's field of view, wherein the eyewear has an extended configuration in which the transflective mirror spans (e.g. spans, covers, fills, or overlaps) a portion of the person's field of view, and wherein light from the display which is reflected by the transflective mirror shows a virtual object superimposed on the environment in the person's field of view when the eyewear is in the extended configuration.

In an example, augmented reality eyewear can comprise: an eyewear frame which is worn by a person; a lens (e.g. a substantially-transparent component) on the eyewear frame which is configured to be positioned in front of the person's eye; a display (e.g. a plurality of light-emitting elements which display an image) on the eyewear frame; and a transflective mirror (e.g. partly-reflective and partly-transmissive optical component), wherein the eyewear has a retracted configuration in which the transflective mirror is recessed in the eyewear frame above the lens, wherein the eyewear has an extended configuration in which the transflective mirror extends out from the eyewear frame to span (e.g. span, cover, fill, or overlap) a portion of the person's field of view, and wherein light from the display which is reflected by the transflective mirror shows a virtual object superimposed on the environment in the person's field of view when the eyewear is in the extended configuration.

In an example, augmented reality eyewear can comprise: an eyewear frame which is worn by a person; a lens (e.g. a substantially-transparent component) on the eyewear frame which is configured to be positioned in front of the person's eye; a display (e.g. a plurality of light-emitting elements which display an image) on the eyewear frame; and a transflective mirror (e.g. partly-reflective and partly-transmissive optical component), wherein the eyewear has a retracted configuration in which the transflective mirror spans (e.g. spans, covers, fills, or overlaps) a first portion of the person's field of view, wherein the eyewear has an extended configuration in which the transflective mirror spans (e.g. spans, covers, fills, or overlaps) a second portion of the person's field of view, wherein the second portion is larger than the first portion, and wherein light from the display which is reflected by the transflective mirror shows a virtual object superimposed on the environment in the person's field of view when the eyewear is in the extended configuration.

In an example, augmented reality eyewear can comprise: an eyewear frame which is worn by a person; a display (e.g. a plurality of light-emitting elements which display an image) on the eyewear frame; a movable arm or wheel; a joint or axle which connects the arm or wheel to the frame; and a transflective mirror (e.g. partly-reflective and partly-transmissive optical component) which is part of or attached to the arm or wheel, wherein light from the display which is reflected by the mirror shows a virtual object in the person's field of view, wherein the mirror has a first configuration in which it is retracted out of in the person's field of view, wherein the mirror has a second configuration in which it is extended into the person's field of view, and wherein the mirror is moved from the first configuration to the second configuration by movement of the arm or wheel.

In an example, augmented reality eyewear can comprise: an eyewear frame which is worn by a person; a display (e.g. a plurality of light-emitting elements which display an image) on the eyewear frame; a movable arm or wheel; a joint or axle which connects the arm or wheel to the frame; and a transflective mirror (e.g. partly-reflective and partly-transmissive optical component) which is part of or attached to the arm or wheel, wherein light from the display which is reflected by the mirror shows a virtual object in the person's field of view, wherein the mirror has a first configuration in which it is retracted into the frame above the person's eye, wherein the mirror has a second configuration in which it extends out downward from the frame into the person's field of view, and wherein the mirror is moved from the first configuration to the second configuration by movement of the arm or wheel.

In an example, augmented reality eyewear can comprise: an eyewear frame which is worn by a person; a display (e.g. a plurality of light-emitting elements which display an image) on the eyewear frame; a movable arm or wheel; a joint or axle which connects the arm or wheel to the frame; and a transflective mirror (e.g. partly-reflective and partly-transmissive optical component) which is part of or attached to the arm or wheel, wherein light from the display which is reflected by the mirror shows a virtual object in the person's field of view, wherein the mirror has a first configuration in which it is retracted into the frame, wherein the mirror has a second configuration in which it extends out from the frame, and wherein the mirror is moved from the first configuration to the second configuration by movement of the arm or wheel.

In an example, augmented reality eyewear can comprise: an eyewear frame which is worn by a person; a display (e.g. a plurality of light-emitting elements which display an image) on the eyewear frame; a movable arm or wheel; a joint or axle which connects the arm or wheel to the frame; and a transflective mirror (e.g. partly-reflective and partly-transmissive optical component) which is part of or attached to the arm or wheel, wherein light from the display which is reflected by the mirror shows a virtual object in the person's field of view, wherein the mirror has a first configuration in which it is retracted into a recess in the frame, wherein the mirror has a second configuration in which it extends out from the frame into the person's field of view, and wherein the mirror is moved from the first configuration to the second configuration by movement of the arm or wheel.

In an example, augmented reality eyewear can comprise: an eyewear frame which is worn by a person; a lens (e.g. a substantially-transparent component) on the eyewear frame which is configured to be positioned in front of the person's eye; a display (e.g. plurality of light-emitting elements which display an image) on the eyewear frame; wherein the display is above the lens; and a transflective mirror (e.g. partially-reflective component); wherein the transflective mirror has an upward-retracted configuration in which a best-fitting virtual plane of the mirror is substantially parallel to the display and a downward-extended configuration in which a best-fitting virtual plane of the mirror intersects the best-fitting virtual plane of the display at an acute angle, and wherein light from the display which is reflected by the mirror shows a virtual object superimposed on environmental objects in the person's field of view when the mirror is in the downward-extended configuration.

In an example, augmented reality eyewear can comprise: an eyewear frame which is worn by a person; a display (e.g. a plurality of light-emitting elements which display an image), wherein a first virtual plane best fits the display; and a transflective mirror (e.g. partly-reflective and partly-transmissive optical component), wherein a second virtual plane best fits the display; wherein the transflective mirror has a first configuration in which the first virtual plane and the second virtual plane intersect at a first forward-facing angle, wherein the transflective mirror has a second configuration in which the first virtual plane and the second virtual plane intersect at a second forward-facing angle, wherein the second forward-facing angle is 25 to 65 degrees greater than the first forward-facing angle, wherein the transflective mirror is moved (e.g. manually or by an actuator) from its first configuration to its second configuration, and wherein light from the display is reflected by the transflective mirror in the second configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component) which is connected to the eyewear frame by a hinge (e.g. movable joint), wherein the transflective mirror has a side configuration in which the transflective mirror is aligned with (e.g. parallel to) a sidepiece (e.g. temple) of the eyewear frame, wherein the transflective mirror has a front configuration in which the transflective mirror is in front of one of the person's eyes, wherein the transflective mirror is moved (e.g. manually or by an actuator) from the side configuration to the front configuration by pivoting and/or rotating on the hinge, and wherein light from the display is reflected by the transflective mirror in the front configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component) which is connected to the eyewear frame by a hinge (e.g. movable joint), wherein the transflective mirror has a side configuration in which the transflective mirror is in, on, or along a sidepiece (e.g. temple) of the eyewear frame, wherein the transflective mirror has a front configuration in which the transflective mirror is in front of one of the person's eyes, wherein the transflective mirror is moved (e.g. manually or by an actuator) from the side configuration to the front configuration by pivoting and/or rotating on the hinge, and wherein light from the display is reflected by the transflective mirror in the front configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component) which is connected to the eyewear frame by a hinge (e.g. movable joint), wherein the transflective mirror has a side configuration in which the transflective mirror is recessed within an opening in a sidepiece (e.g. temple) of the eyewear frame, wherein the transflective mirror has a front configuration in which the transflective mirror extends out in front of one of the person's eyes, wherein the transflective mirror is moved (e.g. manually or by an actuator) from the side configuration to the front configuration by pivoting and/or rotating on the hinge, and wherein light from the display is reflected by the transflective mirror in the front configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is folded out of the person's field of view, wherein the transflective mirror has an extended configuration in which the transflective mirror is unfolded into the person's field of view, wherein the transflective mirror is unfolded from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is folded upward out of the person's field of view, wherein the transflective mirror has an extended configuration in which the transflective mirror is unfolded downward into the person's field of view, wherein the transflective mirror is unfolded from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is pivoted or rotated out of the person's field of view, wherein the transflective mirror has an extended configuration in which the transflective mirror is pivoted or rotated into the person's field of view, wherein the transflective mirror is pivoted or rotated from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is rolled out of the person's field of view, wherein the transflective mirror has an extended configuration in which the transflective mirror is unrolled into the person's field of view, wherein the transflective mirror is unrolled from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is rolled upward out of the person's field of view, wherein the transflective mirror has an extended configuration in which the transflective mirror is unrolled downward into the person's field of view, wherein the transflective mirror is unrolled from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is folded out of the person's field of view, wherein the transflective mirror has an extended configuration in which the transflective mirror is unfolded into the person's field of view, wherein the transflective mirror is unfolded from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is slid upwards out of the person's field of view, wherein the transflective mirror has an extended configuration in which the transflective mirror is slid downward into the person's field of view, wherein the transflective mirror is slid from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is slid laterally out of the person's field of view, wherein the transflective mirror has an extended configuration in which the transflective mirror is slid laterally into the person's field of view, wherein the transflective mirror is slid from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is telescopically contracted out of the person's field of view, wherein the transflective mirror has an extended configuration in which the transflective mirror is telescopically extended into the person's field of view, wherein the transflective mirror is telescopically extended from the retracted configuration to the extended configuration, and wherein light from the display is reflected by the transflective mirror in the extended configuration to display a virtual object in the person's field of view.

In an example, augmented reality eyewear can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a retracted configuration in which the transflective mirror is telescopically retracted out of the person's field of view, wherein the transflective mirror has an extended configuration in which the transflective mirror is telescopically extended into the person's field of view, wherein the transflective mirror is moved (e.g. manually or by an actuator) from the retracted configuration to the extended configuration, and wherein light from the display is reflected by the transflective mirror in the extended configuration to display a virtual object in the person's field of view.

In an example, a method of changing the display mode of augmented reality eyewear can comprise: moving a transflective mirror (e.g. partly-reflective and partly-transmissive optical component) from a first configuration wherein the mirror is in a recess and/or compartment in an eyewear frame to a second location wherein the mirror extends out from the eyewear frame into the person's field of view, wherein the transflective mirror reflects light from a display (e.g. a plurality of light-emitting elements) in order to display a virtual object in the person's field of view in the second configuration.

In an example, a method of changing the display mode of augmented reality eyewear can comprise: moving a transflective mirror (e.g. partly-reflective and partly-transmissive optical component) from a first location which is not in a person's field of view to a second location which is in the person's field of view, wherein the transflective mirror reflects light from a display (e.g. a plurality of light-emitting elements) in order to display a virtual object in the person's field of view. In an example, a method of changing the display mode of augmented reality eyewear can comprise: pivoting and/or rotating a transflective mirror (e.g. partly-reflective and partly-transmissive optical component) from a first location which is not in a person's field of view to a second location which is in the person's field of view, wherein the transflective mirror reflects light from a display (e.g. a plurality of light-emitting elements) in order to display a virtual object in the person's field of view.

In an example, a method of changing the display mode of augmented reality eyewear can comprise: unrolling and/or un-scrolling a transflective mirror (e.g. partly-reflective and partly-transmissive optical component) from a first location which is not in a person's field of view to a second location which is in the person's field of view, wherein the transflective mirror reflects light from a display (e.g. a plurality of light-emitting elements) in order to display a virtual object in the person's field of view. In an example, a method of changing the display mode of augmented reality eyewear can comprise: sliding a transflective mirror (e.g. partly-reflective and partly-transmissive optical component) from a first location which is not in a person's field of view to a second location which is in the person's field of view, wherein the transflective mirror reflects light from a display (e.g. a plurality of light-emitting elements) in order to display a virtual object in the person's field of view.

In an example, a method of changing the display mode of augmented reality eyewear can comprise: telescopically-extending a transflective mirror (e.g. partly-reflective and partly-transmissive optical component) from a first location which is not in a person's field of view to a second location which is in the person's field of view, wherein the transflective mirror reflects light from a display (e.g. a plurality of light-emitting elements) in order to display a virtual object in the person's field of view. In an example, a method of changing the display mode of augmented reality eyewear can comprise: unfolding a transflective mirror (e.g. partly-reflective and partly-transmissive optical component) from a first location which is not in a person's field of view to a second location which is in the person's field of view, wherein the transflective mirror reflects light from a display (e.g. a plurality of light-emitting elements) in order to display a virtual object in the person's field of view.

In an example, a method of changing the display mode of augmented reality eyewear can comprise: unfolding a transflective mirror (e.g. partly-reflective and partly-transmissive optical component) from a first configuration wherein the mirror is in a recess and/or compartment in an eyewear frame to a second location wherein the mirror extends out from the eyewear frame into the person's field of view, wherein the transflective mirror reflects light from a display (e.g. a plurality of light-emitting elements) in order to display a virtual object in the person's field of view in the second configuration. In an example, a method of changing the display mode of augmented reality eyewear can comprise: pivoting and/or rotating a transflective mirror (e.g. partly-reflective and partly-transmissive optical component) from a first configuration wherein the mirror is in a recess and/or compartment in an eyewear frame to a second location wherein the mirror extends out from the eyewear frame into the person's field of view, wherein the transflective mirror reflects light from a display (e.g. a plurality of light-emitting elements) in order to display a virtual object in the person's field of view in the second configuration.

In an example, a method of changing the display mode of augmented reality eyewear can comprise: unrolling and/or un-scrolling a transflective mirror (e.g. partly-reflective and partly-transmissive optical component) from a first configuration wherein the mirror is in a recess and/or compartment in an eyewear frame to a second location wherein the mirror extends out from the eyewear frame into the person's field of view, wherein the transflective mirror reflects light from a display (e.g. a plurality of light-emitting elements) in order to display a virtual object in the person's field of view in the second configuration. In an example, a method of changing the display mode of augmented reality eyewear can comprise: sliding a transflective mirror (e.g. partly-reflective and partly-transmissive optical component) from a first configuration wherein the mirror is in a recess and/or compartment in an eyewear frame to a second location wherein the mirror extends out from the eyewear frame into the person's field of view, wherein the transflective mirror reflects light from a display (e.g. a plurality of light-emitting elements) in order to display a virtual object in the person's field of view in the second configuration.

In an example, a method of changing the display mode of augmented reality eyewear can comprise: telescopically-extending a transflective mirror (e.g. partly-reflective and partly-transmissive optical component) from a first configuration wherein the mirror is in a recess and/or compartment in an eyewear frame to a second location wherein the mirror extends out from the eyewear frame into the person's field of view, wherein the transflective mirror reflects light from a display (e.g. a plurality of light-emitting elements) in order to display a virtual object in the person's field of view in the second configuration.

In an example, an augmented reality eyewear system can comprise a transflective mirror, wherein the mirror has a first configuration in which it is attached to a sidepiece (e.g. temple) of an eyewear frame and a second configuration in which it is attached to the front piece of the eyewear frame. In an example, a modular augmented reality eyewear system can comprise a transflective mirror, wherein the mirror has a first configuration in which it is attached to a sidepiece (e.g. temple) of an eyewear frame and a second configuration in which it is attached to a lens in front of an eye. In an example, a modular augmented reality eyewear system can comprise a transflective mirror, wherein the mirror has a first configuration in which it is attached to a sidepiece (e.g. temple) of an eyewear frame and a second configuration in which it is inserted into a lens in front of an eye.

In an example, an augmented reality eyewear system can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration in which it is not attached to (or inserted into) the eyewear frame; wherein the transflective mirror has a second configuration in which it is attached to (or inserted into) the eyewear frame; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration in which it is not attached to a front piece of the eyewear frame; wherein the transflective mirror has a second configuration in which it is attached to a front piece of the eyewear frame; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; and a transflective mirror (e.g. partly-reflective and partly-transmissive optical component), wherein the transflective mirror has a first configuration in which it is inserted into a front piece of the eyewear frame; wherein the transflective mirror has a second configuration in which it is inserted into the front piece of the eyewear frame; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; a lens (e.g. substantially transparent component; and a transflective mirror (e.g. partly-reflective and partly-transmissive optical component), wherein the transflective mirror has a first configuration in which it is not attached to the lens; wherein the transflective mirror has a second configuration in which it is attached to the lens; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; a lens (e.g. substantially transparent component; and a transflective mirror (e.g. partly-reflective and partly-transmissive optical component), wherein the transflective mirror has a first configuration in which it is not inserted into the lens; wherein the transflective mirror has a second configuration in which it is inserted into the lens; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; and a transflective mirror (e.g. partly-reflective and partly-transmissive optical component), wherein the display and the transflective mirror have a first configuration in which they are not attached to the eyewear frame; wherein the display and the transflective mirror have a second configuration in which they are attached to the eyewear frame; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; and a transflective mirror (e.g. partly-reflective and partly-transmissive optical component), wherein the display and the transflective mirror have a first configuration in which they are not attached to a front piece of the eyewear frame; wherein the display and the transflective mirror have a second configuration in which they are attached to the front piece of the eyewear frame; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; and a transflective mirror (e.g. partly-reflective and partly-transmissive optical component), wherein the display and the transflective mirror have a first configuration in which they are not inserted into the eyewear frame; wherein the display and the transflective mirror have a second configuration in which they are inserted into the eyewear frame; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; and a transflective mirror (e.g. partly-reflective and partly-transmissive optical component), wherein the display and the transflective mirror are inserted into a front piece of the eyewear frame in a first configuration; wherein the display and the transflective mirror are inserted into a front piece of the eyewear frame in a second configuration; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; a lens (e.g. substantially transparent component; and a transflective mirror (e.g. partly-reflective and partly-transmissive optical component), wherein the display and the transflective mirror have a first configuration in which they are not attached to the lens; wherein the display and the transflective mirror have a second configuration in which they are attached to the lens; wherein light from the display is reflected by the transflective mirror and displays a virtual object in the person's field of view when the transflective mirror is in the second configuration.

In an example, an augmented reality eyewear system can comprise: an eyewear frame which is worn by a person; a display (e.g. a plurality of light-emitting elements which display an image) on the eyewear frame; a lens (e.g. substantially transparent component; and a transflective mirror (e.g. partly-reflective and partly-transmissive optical component), wherein the display and the transflective mirror have a first configuration in which they are not inserted into the lens; wherein the display and the transflective mirror have a second configuration in which they are not inserted into the lens; wherein light from the display is reflected by the transflective mirror and displays a virtual object in the person's field of view when the transflective mirror is in the second configuration.

In an example, a transflective mirror can be a partial mirror, wherein the partial mirror reflects a percentage of incident light and transmits the rest of the incident light. In an example, a transflective mirror can be a partially-reflective mirror. In an example, a transflective mirror can be a half mirror, wherein the half mirror reflects half of incident light and transmits half of incident light. In an example, a transflective mirror can reflect a percentage (e.g. between 40% and 60%) of incident light and transmit the rest (e.g. 100% minus the percentage) of the incident light. In an example, a transflective mirror can reflect a percentage (e.g. between 20% and 40%) of incident light and transmit the rest (e.g. 100% minus the percentage) of the incident light. In an example, a transflective mirror can reflect a percentage (e.g. between 60% and 80%) of incident light and transmit the rest (e.g. 100% minus the percentage) of the incident light.

In an example, a transflective mirror can be a one-way mirror. In an example, a transflective mirror can be concave. In an example, a transflective mirror can be curved. In an example, a transflective mirror can be flat. In an example, a transflective mirror can comprise a partially-reflective coating on a transparent optical component. In an example, a transflective mirror can comprise a partially-reflective coating or film. In an example, a transflective mirror can comprise a reflective coating on a transparent optical component. In an example, a transflective mirror can comprise a reflective coating or film. In an example, a transflective mirror can be a Fresnel reflector. In an example, a transflective mirror can be a portion and/or segment of a Fresnel reflector. In an example, augmented reality eyewear with a transflective mirror can comprise a birdbath optical system.

In an example, a transflective mirror can be moved from a first configuration to a second configuration by an actuator. In an example, a transflective mirror can be moved from a first configuration to a second configuration by an electromagnetic actuator. In an example, a transflective mirror can be comprised of a plurality of (partially) reflective louvers, wherein the location, size, and/or shape of the transflective mirror is changed by changing the configuration of the louvers. In an example, a transflective mirror can be comprised of a plurality of (partially) reflective louvers, wherein the location, size, and/or shape of the transflective mirror is changed by changing the configuration of orientations of the louvers.

In an example, a transflective mirror can be comprised of a plurality of (partially) reflective louvers, wherein the location, size, and/or shape of the transflective mirror is changed by changing the configuration of some or all of the louvers. In an example, a transflective mirror can be comprised of a plurality of (partially) reflective louvers, wherein the location, size, and/or shape of the transflective mirror is changed by changing the angles of some or all of the louvers. In an example, a transflective mirror can comprise a plurality of movable partially-reflective sections. In an example, a transflective mirror can comprise a plurality of overlapping partially-reflective sections.

In an example, a transflective mirror can comprise a plurality of pivoting and/or rotating partially-reflective sections. In an example, a transflective mirror can comprise a plurality of sliding partially-reflective sections. In an example, a transflective mirror can comprise a plurality of telescoping partially-reflective sections. In an example, a transflective mirror can comprise a plurality of folding partially-reflective sections. In an example, a transflective mirror can comprise a plurality of movable louvers which are tilted at different angles, wherein tilting the louvers changes the location of the transflective mirror. In an example, a transflective mirror can comprise a series of movable louvers.

In an example, a central portion of a transflective mirror can be more reflective than a peripheral portion of the transflective mirror. In an example, a central portion of a transflective mirror can be less reflective than a peripheral portion of the transflective mirror. In an example, a central portion of a transflective mirror can have a lower refractive index than a peripheral portion of the mirror. In an example, a central portion of a transflective mirror can have a higher refractive index than a peripheral portion of the mirror.

In an example, a transflective mirror can function as a beam combiner which combines light beams from two directions into a combined light beam in in one direction. In an example, a transflective mirror can function as a beam combiner which combines light beams from two vectors into a combined light beam along one vector. In an example, a transflective mirror can function as a beam combiner which combines light from environmental objects with light from the display. In an example, a transflective mirror can function as a beam combiner which combines light rays from environmental objects along a first vector with light rays from the display along a second vector into combined light rays along the first vector.

In an example, a transflective mirror can function as a beam combiner which combines light rays from environmental objects along a first vector with light rays from the display along a second vector into combined light rays along the second vector. In an example, a transflective mirror can function as a beam splitter which splits a light beam from one direction into lights beams in two directions. In an example, a transflective mirror can function as a beam splitter which splits a light beam from one vector into two light beams along two vectors.

In an example, a transflective mirror can have a circular, elliptical, or oblong shape. In an example, a transflective mirror can have a quadrilateral or rounded-quadrilateral shape. In an example, a transflective mirror of adjustable size can be formed by the overlap and/or intersection of two movable components. In an example, different portions of a transflective mirror can have different levels of reflectivity. In an example, different portions of a transflective mirror can have different refractive indexes. In an example, augmented reality eyewear can comprise a galvanometer mirror which reflects light rays from a display toward a transflective mirror. In an example, augmented reality eyewear can comprise a lens with two or more electrochromic sections, wherein transmitting electrical current through a first electrochromic section causes creates a transflective mirror in a first location, and wherein transmitting electrical current through a second electrochromic section creates a transflective mirror in a second location.

In an example, augmented reality eyewear can comprise a lens with two or more electrochromic sections, wherein activation of a first electrochromic section causes creates a transflective mirror in a first location, and wherein activation of a second electrochromic section creates a transflective mirror in a second location. In an example, augmented reality eyewear can comprise a lens with two or more electrochromic sections, wherein activation of a first electrochromic section causes creates a transflective mirror in a first location, and wherein activation of a second electrochromic section creates a transflective mirror in a second location, wherein the second location is more central to a person's field of vision than the first location.

In an example, augmented reality eyewear can comprise a micro-mirror array. In an example, augmented reality eyewear can comprise a micromirror array which reflects light rays from a display toward a transflective mirror. In an example, augmented reality eyewear can comprise an acousto-optic mechanism. In an example, augmented reality eyewear can comprise an acousto-optic mechanism which changes the reflection properties of a transflective mirror. In an example, augmented reality eyewear can comprise an acousto-optic mechanism which changes the vectors of light reflected by a transflective mirror. In an example, augmented reality eyewear can comprise an acousto-optic mechanism which changes the shape of a transflective mirror. In an example, augmented reality eyewear can comprise an acousto-optic mechanism.

In an example, augmented reality eyewear can comprise an acousto-optic mechanism which changes the reflectivity of a transflective mirror. In an example, augmented reality eyewear can comprise an acousto-optic mechanism which changes the refractive index of a transflective mirror. In an example, augmented reality eyewear can comprise an array of transflective mirrors. In an example, augmented reality eyewear can comprise an electro-optic mechanism. In an example, augmented reality eyewear can comprise an electro-optic mechanism which changes the reflectivity of a transflective mirror. In an example, augmented reality eyewear can comprise an electro-optic mechanism which changes the refractive index of a transflective mirror.

In an example, augmented reality eyewear can comprise two transflective mirrors, wherein a first transflective mirror is flat and a second transflective mirror is arcuate. In an example, augmented reality eyewear can comprise a flat transflective mirror and a curved transflective mirror, wherein light from the display is reflected by the flat transflective mirror toward the curved transflective mirror. In an example, augmented reality eyewear can comprise a flat transflective mirror and a curved transflective mirror, wherein light from the environment passes through the curved transflective mirror before passing through the flat transflective mirror.

In an example, augmented reality eyewear can comprise a flat transflective mirror and a curved transflective mirror, wherein the eyewear has a first configuration in which both mirrors are retracted out of a person's field of view and a second configuration in which both mirrors are in the person's field of view. In an example, augmented reality eyewear can comprise a flat transflective mirror and a curved transflective mirror, wherein the eyewear has a first configuration in which the flat mirror is retracted out of a person's field of view and a second configuration in which the flat mirror is in the person's field of view, and wherein the curved transmissive mirror remains in the person's field of view in both configurations.

In an example, augmented reality eyewear can comprise two transflective mirrors, wherein a first transflective mirror is a portion of a flat plane and a second transflective mirror has a shape which is a portion of a sphere. In an example, augmented reality eyewear can comprise two transflective mirrors, wherein a first transflective mirror is a first distance from a person's eye and a second transflective mirror is a second distance from the person's eye, and wherein the second distance is greater than the first distance.

In an example, augmented reality eyewear can comprise two transflective mirrors, wherein a first transflective mirror is flat, wherein the second transflective mirror is arcuate, and wherein the second transflective mirror is farther from a person's eye than the first transflective mirror. In an example, augmented reality eyewear can comprise two transflective mirrors, wherein a first transflective mirror is movable relative to the eyewear frame and a second transflective mirror is stationary relative to the eyewear frame. In an example, augmented reality eyewear can comprise two transflective mirrors, wherein both a first transflective mirror and a second transflective mirror are movable relative to the eyewear frame.

In an example, augmented reality eyewear can comprise a moving micromirror array which continues to reflect light rays from a display toward a transflective mirror when the mirror moves. In an example, augmented reality eyewear can further comprise a scanning mirror which directs light rays from a display toward a transflective mirror, even when the transflective mirror moves from one location to another. In an example, augmented reality eyewear can further comprise a scanning mirror which changes the direction of light rays from a display so that the light rays continue to be directed toward the transflective mirror as the mirror moves.

In an example, augmented reality eyewear can further comprise a scanning mirror which changes the direction of light rays reflected from a display so that the light rays continue to be directed toward the transflective mirror even when the mirror moves. In an example, augmented reality eyewear can further comprise a scanning mirror which reflects light rays from a display toward a transflective mirror, changing the direction of these reflected light rays to track the changing location of the transflective mirror when it moves. In an example, augmented reality eyewear can further comprise a scanning (e.g. moving) mirror which reflects light rays from a display toward a transflective mirror, wherein the scanning mirror moves to continue to reflect light rays from the display toward the transflective mirror when the mirror moves from a first location (e.g. first area in a person's field of view) to a second location (e.g. second area in the person's field of view).

In an example, augmented reality eyewear with a moving transflective mirror can track the changing location of the mirror and change the direction of light rays projected from the display in order to maintain optical communication with the mirror. In an example, augmented reality eyewear with a moving transflective mirror can track the changing location of the mirror and change the direction of light rays projected from the display in order to keep those light rays directed toward the mirror. In an example, augmented reality eyewear can comprise a moving galvanometer mirror which continues to reflect light rays from a display toward a transflective mirror when the mirror moves. In an example, augmented reality eyewear can further comprise a spatial light modulator.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and a scanning mirror; wherein light from the display is reflected toward the transflective mirror by the scanning mirror, wherein light from the display reflected by the transflective mirror shows a virtual object in the person's field of view, wherein the transflective mirror has a first configuration at a first location in the person's field of view, wherein the transflective mirror has a second configuration at a second location in the person's field of view, and wherein the transflective mirror is moved from the first configuration to the second configuration.

In an example, augmented reality eyewear can comprise: an eyewear frame which is worn by a person; a display (e.g. a plurality of light-emitting elements which display an image) on the eyewear frame; a transflective mirror (e.g. partly-reflective and partly-transmissive optical component); and a scanning mirror; wherein light from the display is reflected toward the transflective mirror by the scanning mirror, wherein light from the display reflected by the transflective mirror shows a virtual object in the person's field of view, wherein the transflective mirror has a first configuration at a first location in the person's field of view, wherein the transflective mirror has a second configuration at a second location in the person's field of view, wherein the transflective mirror is moved from the first configuration to the second configuration, and wherein the scanning mirror moves when the transflective mirror is moved so as to continue to direct light from the display toward the transflective mirror.

In an example, a display can be a LCOS display. In an example, a display can be a microdisplay. In an example, a display can comprise a plurality of active-matrix organic light emitting diodes. In an example, a display can comprise a plurality of laser diodes. In an example, a display can comprise a plurality of light emitting diodes. In an example, a display can comprise a plurality of organic light emitting diodes. In an example, a display can comprise a plurality of resonant-cavity light emitting diodes. In an example, a display can comprise a plurality of vertical cavity surface emitting lasers. In an example, a display can comprise an AMOLED display. In an example, a display can comprise an LCD display. In an example, a display can comprise an OLED display. In an example, light from a display can be coherent. In an example, light from a display can be collimated.

In an example, augmented reality eyewear can further comprise a data processor (e.g. a central processing unit). In an example, augmented reality eyewear can further comprise a diffractive optical element. In an example, augmented reality eyewear can further comprise a dynamic lens with an adjustable focal length. In an example, augmented reality eyewear can further comprise a hologram (e.g. a polarization volume hologram). In an example, augmented reality eyewear can further comprise a microlens array. In an example, augmented reality eyewear can further comprise a refractive coupler. In an example, augmented reality eyewear can further comprise a tunable liquid crystal lens. In an example, augmented reality eyewear can further comprise a volume holographic grating.

In an example, a first virtual plane best fits a transflective mirror in its first configuration, a second virtual plane best fits the transflective mirror in its second configuration, eyewear further comprises an optical lens, a third virtual plane best fits the optical lens, and the first and third virtual planes intersect each other at an angle between 35 degrees and 55 degrees. In an example, an eyewear frame can have an opening, recess, or compartment into which a transflective mirror is folded in a first configuration. In an example, the same virtual plane best fits a transflective mirror in both its first and second configurations. In an example, a transflective mirror can comprise a plurality of folding slats or louvers which are not coplanar in the first configuration and are coplanar in the second configuration.

In an example, eyewear comprises two movable transflective mirrors, wherein a first transflective mirror is closer to a person's eye than a second transflective mirror, wherein light rays from a display are reflected by the first transflective mirror toward the second transflective mirror and then reflected by the second transflective mirror toward a person's eye. In an example, there can be an opening, recess, or compartment in a side piece (e.g. temple) of eyewear to one side of a lens into which a transflective mirror is rolled or scrolled up in a first configuration. In an example, a transflective mirror can comprise a plurality of (partially) reflective sections which are not coplanar in the first configuration and are coplanar in the second configuration.

In an example, eyewear can further comprise a hinge (or other movable joint), wherein a transflective mirror has a first configuration in which it is alongside a side piece (e.g. temple) of eyewear and a second configuration in which is in front of a person's eye, and wherein the transflective mirror is moved from the first configuration to the second configuration by being pivoted or rotated around the hinge. In an example, there can be an opening, recess, or compartment in a side piece (e.g. temple) of eyewear to one side of a lens into which a transflective mirror is retracted in a first configuration. In an example, a first virtual plane best fits a transflective mirror in its first configuration, a second virtual plane best fits the transflective mirror in its second configuration, eyewear further comprises an optical lens, a third virtual plane best fits the optical lens, and the second and third virtual planes are parallel to each other.

In an example, an eyewear frame can have an opening, recess, or compartment into which a transflective mirror is pivoted or rotated in a first configuration. In an example, there can be an opening, recess, or compartment in a front piece of eyewear into which a transflective mirror is folded in a first configuration. In an example, a first virtual plane best fits a transflective mirror in its first configuration, a second virtual plane best fits the transflective mirror in its second configuration, and the first and second virtual planes intersect each other at an acute angle. In an example, a transflective mirror can have a first configuration in which it is parallel with a side piece (e.g. temple) of eyewear and a second configuration in which is parallel with a front piece of the eyewear.

In an example, one side of a transflective mirror can have a surface area which is between one quarter and four square inches. In an example, a first virtual plane best fits a transflective mirror in its first configuration, a second virtual plane best fits the transflective mirror in its second configuration, eyewear further comprises an optical lens, a third virtual plane best fits the optical lens, and the second and third virtual planes are orthogonal to each other. In an example, an eyewear frame can have an opening, recess, or compartment into which a transflective mirror is slid in a first configuration. In an example, there can be an opening, recess, or compartment in a front piece of eyewear into which a transflective mirror is rolled or scrolled up in a first configuration.

In an example, a first virtual plane best fits a transflective mirror in its first configuration, a second virtual plane best fits the transflective mirror in its second configuration, eyewear further comprises an optical lens, a third virtual plane best fits the optical lens, and the second and third virtual planes intersect each other at an acute angle. In an example, eyewear can comprise first and second transflective mirrors, wherein in a first configuration both mirrors are retracted out of a person's field of view and in a second configuration both mirrors are in the person's field of view, wherein in the second configuration the two mirrors collectively reflect light rays from a display toward a person's eye to display a virtual object in the person's field of view.

In an example, there can be an opening, recess, or compartment in a front piece of eyewear into which a transflective mirror is pivoted or rotated in a first configuration. In an example, a first virtual plane best fits a transflective mirror in its first configuration, a second virtual plane best fits the transflective mirror in its second configuration, eyewear further comprises an optical lens, a third virtual plane best fits the optical lens, and the second and third virtual planes intersect each other at an angle between 35 degrees and 55 degrees. In an example, eyewear can comprise first and second transflective mirrors, wherein in a first configuration both mirrors slide out of a person's field of view and in a second configuration both mirrors extend into the person's field of view, wherein in the second configuration the two mirrors collectively reflect light rays from a display toward a person's eye to display a virtual object in the person's field of view.

In an example, there can be an opening, recess, or compartment in a front piece of eyewear into which a transflective mirror is slid in a first configuration. In an example, a first virtual plane best fits a transflective mirror in its first configuration, a second virtual plane best fits the transflective mirror in its second configuration, eyewear further comprises an optical lens, a third virtual plane best fits the optical lens, and the first and third virtual planes are parallel to each other. In an example, a transflective mirror has a centroid. In an example, the centroid of a transflective mirror in its first configuration can be in a first location and the centroid of the transflective mirror in its second configuration can be in a second location, wherein the distance between the first location and the second location is between one half inch and three inches.

In an example, a first virtual plane best fits a transflective mirror in its first configuration, a second virtual plane best fits the transflective mirror in its second configuration, eyewear further comprises an optical lens, a third virtual plane best fits the optical lens, and the second and third virtual planes intersect each other at an angle between 20 degrees and 45 degrees. In an example, eyewear can comprise first and second transflective mirrors, wherein in a first configuration both mirrors pivot or rotate out of a person's field of view and in a second configuration both mirrors pivot or rotate into the person's field of view, wherein in the second configuration the two mirrors collectively reflect light rays from a display toward a person's eye to display a virtual object in the person's field of view.

In an example, there can be an opening, recess, or compartment in a front piece of eyewear above a lens into which a transflective mirror is retracted in a first configuration. In an example, a transflective mirror can be between one quarter inch and three inches in diameter. In an example, eyewear can comprise first and second transflective mirrors, wherein in a first configuration both mirrors move out of a person's field of view and in a second configuration both mirrors move into the person's field of view, wherein in the second configuration the two mirrors collectively reflect light rays from a display toward a person's eye to display a virtual object in the person's field of view. In an example, there can be an opening, recess, or compartment in a front piece of eyewear above a lens into which a transflective mirror is folded in a first configuration.

In an example, a transflective mirror can be between one quarter inch and three inches in diameter in its second configuration. In an example, eyewear can comprise first and second transflective mirrors, wherein in a first configuration both mirrors move upward out of the person's field of view and in a second configuration both mirrors move downward into the person's field of view, wherein in the second configuration the two mirrors collectively reflect light rays from a display toward a person's eye to display a virtual object in the person's field of view. In an example, there can be an opening, recess, or compartment in a front piece of eyewear above a lens into which a transflective mirror is rolled or scrolled up in a first configuration.

In an example, a transflective mirror can have a diameter which is between one quarter inch and three inches. In an example, eyewear comprises two transflective mirrors, wherein a first transflective mirror is closer to a person's eye than a second transflective mirror, wherein the first transflective mirror moves from a first configuration to a second configuration, wherein light rays from a display are reflected by the first transflective mirror toward the second transflective mirror and then reflected by the second transflective mirror toward a person's eye when the first transflective mirror is in the second configuration. In an example, there can be an opening, recess, or compartment in a side piece (e.g. temple) of eyewear to one side of a lens into which a transflective mirror is slid in a first configuration.

In an example, a transflective mirror can comprise a plurality of pivoting slats or louvers which are not coplanar in the first configuration and are coplanar in the second configuration. In an example, eyewear comprises two movable transflective mirrors, a flat transflective mirror which is closer to a person's eye, and a curved transflective mirror which is farther from the person's eye, wherein the flat transflective mirror has a first configuration in a first location and a second configuration in a second location, wherein light rays from a display are reflected by the first transflective mirror toward the second transflective mirror and then reflected by the second transflective mirror toward a person's eye in the second configuration.

In an example, there can be an opening, recess, or compartment in a side piece (e.g. temple) of eyewear to one side of a lens into which a transflective mirror is pivoted or rotated in a first configuration. In an example, a first virtual plane best fits a transflective mirror in its first configuration, a second virtual plane best fits the transflective mirror in its second configuration, eyewear further comprises an optical lens, a third virtual plane best fits the optical lens, and the first and third virtual planes are orthogonal to each other. In an example, a transflective mirror has a perimeter.

In an example, the perimeter of a transflective mirror outlines a first area when the mirror is in its first configuration, the perimeter of a transflective mirror outlines a second area when the mirror is in its second configuration, and then first and second areas do not overlap at all. In an example, a first virtual plane best fits a transflective mirror in its first configuration, a second virtual plane best fits the transflective mirror in its second configuration, eyewear further comprises an optical lens, a third virtual plane best fits the optical lens, and the first and third virtual planes intersect each other at an acute angle. In an example, an eyewear frame can have an opening, recess, or compartment into which a transflective mirror is retracted in a first configuration.

In an example, the perimeter of a transflective mirror outlines a first area when the mirror is in its first configuration, the perimeter of a transflective mirror outlines a second area when the mirror is in its second configuration, and the second areas does overlap more than 25% of the first area. In an example, a (side of an) optical lens can be conceptually divided into a central portion and a peripheral portion, wherein the central portion is inside a circle centered on the center of the lens with a diameter which is half of the diameter of the (side of the) lens, and the peripheral portion is outside that circle. In an example, a transflective mirror can have a diameter which is between one quarter inch and three inches in its second configuration.

In an example, eyewear comprises two transflective mirrors, wherein a first transflective mirror is closer to a person's eye than a second transflective mirror, wherein the first transflective mirror moves from a first configuration to a second configuration, wherein light rays from a display are not reflected by the first transflective mirror toward the second transflective mirror in the first configuration, and wherein light rays from a display are reflected by the first transflective mirror toward the second transflective mirror and then reflected by the second transflective mirror toward a person's eye when the first transflective mirror is in the second configuration. In an example, a first virtual plane best fits a transflective mirror in its first configuration, a second virtual plane best fits the transflective mirror in its second configuration, and the first and second virtual planes intersect each other at an angle between 35 and 55 degrees.

In an example, a transflective mirror can have a first configuration in which it is alongside a side piece (e.g. temple) of eyewear and a second configuration in which is in front of a person's eye. In an example, one side of a transflective mirror can have a surface area which is between one and four square inches. In an example, a first virtual plane best fits a transflective mirror in its first configuration, a second virtual plane best fits the transflective mirror in its second configuration, eyewear further comprises an optical lens, a third virtual plane best fits the optical lens, and the first and third virtual planes intersect each other at an angle between 20 degrees and 45 degrees. In an example, an eyewear frame can have an opening, recess, or compartment into which a transflective mirror is rolled or scrolled up in a first configuration.

In an example, there can be an opening, recess, or compartment in a front piece of eyewear into which a transflective mirror is retracted in a first configuration. In an example, a first virtual plane best fits a transflective mirror in its first configuration, a second virtual plane best fits the transflective mirror in its second configuration, and the first and second virtual planes intersect each other at an angle between 20 and 45 degrees. In an example, a transflective mirror can have a first configuration in which it is alongside a side piece (e.g. temple) of eyewear and a second configuration in which is in front of a lens which is in front a person's eye.

In an example, one side of a transflective mirror can have a surface area which is between one quarter and four square inches in its second configuration. In an example, a first virtual plane best fits a transflective mirror in its first configuration, a second virtual plane best fits the transflective mirror in its second configuration, and the first and second virtual planes are parallel to each other. In an example, a transflective mirror can have a first configuration in a first location on a lens and a second configuration on a second location on the lens, wherein the first location is on a peripheral portion of the lens, wherein the second location is on a central portion of the lens, wherein the central portion is inside a circle centered on the center of the lens with a diameter which is one third of the diameter of the (side of the) lens, and wherein the peripheral portion is outside that circle.

In an example, the centroid of a transflective mirror in its first configuration can be in a first location and the centroid of the transflective mirror in its second configuration can be in a second location, wherein the distance between the first location and the second location is at least one half inch. In an example, a transflective mirror can comprise a plurality of slats or louvers which are not coplanar in the first configuration and are coplanar in the second configuration. In an example, eyewear can further comprise a hinge (or other movable joint), wherein a transflective mirror has a first configuration in which it is alongside a side piece (e.g. temple) of eyewear and a second configuration in which is in front of a lens which is in front a person's eye, and wherein the transflective mirror is moved from the first configuration to the second configuration by being pivoted or rotated around the hinge.

In an example, there can be an opening, recess, or compartment in a side piece (e.g. temple) of eyewear to one side of a lens into which a transflective mirror is folded in a first configuration. In an example, a (side of an) optical lens can be conceptually divided into a central portion and a peripheral portion, wherein the central portion is inside a circle centered on the center of the lens with a diameter which is a third of the diameter of the (side of the) lens, and the peripheral portion is outside that circle. In an example, a transflective mirror can have a first configuration in which it is aligned with a side piece (e.g. temple) of eyewear and a second configuration in which is aligned with a front piece of the eyewear.

In an example, eyewear comprises two transflective mirrors, wherein a first transflective mirror is closer to a person's eye than a second transflective mirror, wherein the first transflective mirror and the second transflective mirror move from a first configuration to a second configuration, wherein light rays from a display are not reflected by the first transflective mirror toward the second transflective mirror in the first configuration, and wherein light rays from a display are reflected by the first transflective mirror toward the second transflective mirror and then reflected by the second transflective mirror toward a person's eye when the first transflective mirror is in the second configuration. In an example, a transflective mirror can be moved from its first configuration to its second configuration by a change in an electromagnetic field.

In an example, eyewear can further comprise a hinge (or other movable joint), wherein a transflective mirror has a first configuration in which it is parallel with a side piece (e.g. temple) of eyewear and a second configuration in which is parallel with a front piece of the eyewear, and wherein the transflective mirror is moved from the first configuration to the second configuration by being pivoted or rotated around the hinge. In an example, there can be an opening, recess, or compartment in a front piece of eyewear above a lens into which a transflective mirror is slid in a first configuration.

In an example, a first virtual plane best fits a transflective mirror in its first configuration, a second virtual plane best fits the transflective mirror in its second configuration, and the first and second virtual planes are orthogonal. In an example, a transflective mirror can have a first configuration in a first location on a lens and a second configuration on a second location on the lens, wherein the first location is on a peripheral portion of the lens, wherein the second location is on a central portion of the lens, wherein the central portion is inside a circle centered on the center of the lens with a diameter which is one half of the diameter of the (side of the) lens, and wherein the peripheral portion is outside that circle. In an example, one side of a transflective mirror can have a surface area which is between one and four square inches in its second configuration.

In an example, a transflective mirror can be moved from its first configuration to its second configuration by an electromagnetic actuator. In an example, eyewear can further comprise a hinge (or other movable joint), wherein a transflective mirror has a first configuration in which it is aligned with a side piece (e.g. temple) of eyewear and a second configuration in which is aligned with a front piece of the eyewear, and wherein the transflective mirror is moved from the first configuration to the second configuration by being pivoted or rotated around the hinge. In an example, there can be an opening, recess, or compartment in a front piece of eyewear above a lens into which a transflective mirror is pivoted or rotated in a first configuration.

In an example, a transflective mirror can be moved from a first configuration to a second configuration by being pivoted or rotated between 35 and 55 degrees. In an example, a movable joint or axle around which a transflective mirror (or arm to which a mirror is attached) is pivoted or rotated can be located in the center of a section of an eyewear frame which is above a lens. In an example, a transflective mirror can be moved from a first configuration to a second configuration by being pivoting or rotating an arm (or wheel) to which the mirror is attached by 45 degrees.

In an example, a transflective mirror can be moved from a first configuration to a second configuration by being pivoting or rotating an arm (or wheel) to which the mirror is attached by between 35 and 55 degrees. In an example, a transflective mirror can be moved from a first configuration to a second configuration by being pivoting or rotating an arm (or wheel) to which the mirror is attached by between 70 and 110 degrees. In an example, a transflective mirror can be between two lenses which are located in front of a person's eye. In an example, a transflective mirror can be moved from a first configuration to a second configuration by being pivoting or rotating an arm (or wheel) to which the mirror is attached by between 50 and 70 degrees.

In an example, the centroid of a transflective mirror can be in an upper-outer quadrant of a lens in a first configuration and in the center of the lens in a second configuration. In an example, the centroid of a transflective mirror can be in an lower-outer quadrant of a lens in a first configuration and in the center of the lens in a second configuration. In an example, a transflective mirror can be between two transparent optical surfaces which are located in front of a person's eye. In an example, a transflective mirror can be moved from a first configuration to a second configuration by being pivoted or rotated 45 degrees. In an example, a transflective mirror can be attached to an articulated arm, wherein the mirror is moved from a first configuration to a second configuration by extending the articulated arm.

In an example, a movable joint or axle around which a transflective mirror (or arm to which a mirror is attached) is pivoted or rotated can be located in the center of a (right or left) side half of the front piece of an eyewear frame. In an example, a transflective mirror can be moved from a first configuration to a second configuration by being pivoted or rotated between 70 and 110 degrees. In an example, a movable joint or axle around which a transflective mirror (or arm to which a mirror is attached) is pivoted or rotated can be located in an outer quadrant (e.g. an extreme right-side or left-side fourth) of the front piece of an eyewear frame.

In an example, a transflective mirror can be attached to two movable arms, wherein the mirror is moved from a first configuration to a second configuration by moving both arms. In an example, a movable arm to which a transflective mirror is attached can be narrower than the mirror. In an example, a transflective mirror can be moved from a first configuration to a second configuration by being pivoted or rotated between 50 and 70 degrees. In an example, the centroid of a transflective mirror can be in an lower-outer quadrant of a person's field of view in a first configuration and in the center of the person's field of view in a second configuration. In an example, a movable joint or axle around which a transflective mirror (or arm to which a mirror is attached) is pivoted or rotated can be located in an inner quadrant (e.g. right-side or left-side fourths closest to the nose) of the front piece of an eyewear frame. In an example, the centroid of a transflective mirror can be in an upper-outer quadrant of a person's field of view in a first configuration and in the center of the person's field of view in a second configuration.

Having now completed an introductory section which covers the general concepts, components, and methods which comprise this invention, this disclosure now transitions to discussion of the specific embodiments of this invention which are shown in FIGS. 1 through 3. Where relevant, the general concepts, components, and methods just discussed can be applied to variations of the embodiments which are shown in FIGS. 1 through 3.

FIG. 1 shows an example of adjustable-mode augmented reality (AR) eyewear with a movable transflective mirror. This eyewear enables a person to select: an environmental viewing mode which provides the person with an excellent (e.g. clear, undistorted, wide-angle) view of the environment; or an augmented reality viewing mode in which a virtual object is prominently (e.g. centrally) displayed in the person's view of the environment. The upper portion of FIG. 1 shows this eyewear in the environmental viewing mode, wherein the transflective mirror is located in the periphery of the person's field of view. The lower portion of FIG. 1 shows this eyewear in augmented reality viewing mode, wherein the transflective mirror is located in a prominent (e.g. central) location in the person's field of view. The solid line arrow in the lower portion shows the movement path of the transflective mirror.

With respect to specific components, FIG. 1 shows augmented reality eyewear comprising: an eyewear frame 101 which is worn by a person; a display (e.g. a plurality of light-emitting elements which display an image) 102 on the eyewear frame; and a transflective mirror (e.g. partly-reflective and partly-transmissive optical component) 103, wherein the transflective mirror has a first configuration in a first location, wherein the transflective mirror has a second configuration in a second location, wherein the second location is closer to the center of the person's field of view than the first location, wherein the transflective mirror is moved from its first configuration to its second configuration, and wherein light 104 from the display is reflected by the transflective mirror to display a virtual object in the person's field of view when the transflective mirror is in the second configuration.

In an example, the eyewear can be eyeglasses. In an example, the eyewear can be a head mounted display. FIG. 1 shows a display and a transflective mirror on the left side of the eyewear. In an example, there can be symmetric components on the right side of eyewear (e.g. a right-side display and right-side transflective mirror) even though they are not explicitly shown in this figure. In this example, the display is on a sidepiece (e.g. temple) of the eyewear. Light from the display is directed toward the inner (e.g. eye-facing) side of a transflective mirror, which reflects (a portion of) it back toward the person's eye. In another example, a display can be on the front piece of eyewear. In another example, light from a display can be first directed toward the outer (e.g. away-from-eye-facing) side of a transflective mirror and then reflected by a second mirror back toward the person's eye.

In an example, a transflective mirror can be a partial mirror. In an example, a transflective mirror can be a half mirror. In an example, a transflective mirror can function as a beam combiner. In an example, a transflective mirror can combine light rays from the environment (which are incident at a first vector) with light rays from a display (which are incident at a second vector). Both of these light rays can be combined into light rays which exit the mirror toward the person's eye. In an example, a transflective mirror can combine light rays from the environment which are incident on the outward-facing (e.g. away from eye) side of the mirror with light rays which are incident on the inward-facing (e.g. toward the eye) side of the mirror. In another example, a transflective mirror can combine light rays from the environment which are incident on the outward-facing (e.g. away from eye) side of the mirror with light rays which are (initially) also incident on the outward-facing (e.g. away from eye) side of the mirror.

In this example, there is a single transflective mirror (on one side of the eyewear) which reflects light from the display directly toward a person's eye. In another example, there can be two transflective mirrors (on one side of the eyewear): a first one which reflects light from the display away from the eye; and a second one which reflects this light back toward the eye. In an example, there can be two transflective mirrors: an inner mirror which reflects light from the display away from the eye; and an outer mirror which reflects this light back toward the eye. In another example, there can be two transflective mirrors: a flat inner mirror which reflects light from the display away from the eye; and a curved outer mirror which reflects this light back toward the eye. When there are two transflective mirrors, one or both of the mirrors can be moved as the device is changed from a first configuration to a second configuration.

In this example, a transflective mirror is moved along a substantially-horizontal path from its first configuration (in the periphery of a person's field of view) to its second configuration (in the center of the person's field of view). In another example, a transflective mirror can be moved along a substantially-vertical path from its first configuration (in the periphery of a person's field of view) to its second configuration (in the center of the person's field of view). In another example, a transflective mirror can be moved along a diagonal (between horizontal and vertical) path from its first configuration (in the periphery of a person's field of view) to its second configuration (in the center of the person's field of view). In an example, a transflective mirror can be moved from an upper-outer quadrant or a lower-outer quadrant of a lens (or a person's field) of view to the center of the lens (or the person's field of view).

In an example, a transflective mirror can be moved manually. In an example, a transflective mirror can be moved automatically by an electrical actuator. In an example, a transflective mirror can be moved from its first configuration to its second configuration by sliding. In an example, a mirror can slide along a track in an eyewear frame or in a lens. In an example, a transflective mirror can be attached to (or part of) a movable arm, wherein the arm pivots or rotates around a movable joint (e.g. axle) which connects it to an eyewear frame or a lens. In an example, a transflective mirror can be moved from its first configuration to its second configuration by pivoting or rotation. In an example, a mirror can pivot or rotate around a movable joint (e.g. axle) which connects it to an eyewear frame or a lens. In an example, a transflective mirror can be attached to (or part of) a movable arm or wheel, wherein the arm or wheel pivots or rotates around a movable joint (e.g. axle) which connects it to an eyewear frame or a lens.

In an example, a transflective mirror can be moved from its first configuration to its second configuration by folding or unfolding. In an example, a transflective mirror can be moved from its first configuration to its second configuration by rolling, scrolling, unrolling, or un-scrolling. In an example, a transflective mirror can be moved from its first configuration to its second configuration by being telescopically-extended or telescopically-retracted.

In an example, eyewear can further comprise a tracking and/or scanning mechanism which tracks changes in the location of a transflective mirror and adjusts the direction of light rays from the display so that these light rays continue to be reflected by the transflective mirror toward the person's eye to display a virtual object in their field of view. In an example, this eyewear can further comprise a scanning mirror and/or digital micromirror array which changes the direction of light rays from the display when the transflective mirror moves so that these light rays continue to be reflected by the transflective mirror toward the person's eye to display a virtual object in their field of view. Example variations discussed elsewhere in this disclosure or priority-linked disclosures can also be applied to the example shown in this figure where relevant.

FIG. 2 shows an example of adjustable-mode augmented reality (AR) eyewear with a movable transflective mirror. This design enables a person to select: an environmental viewing mode which provides the person with an excellent (e.g. clear, undistorted, wide-angle) view of the environment; or an augmented reality viewing mode in which a virtual object is prominently (e.g. centrally) displayed in the person's view of the environment. The upper portion of FIG. 2 shows this eyewear in the environmental viewing mode, wherein the transflective mirror is located in the periphery of the person's field of view. The lower portion of FIG. 2 shows this eyewear in augmented reality viewing mode, wherein the transflective mirror is located in a prominent (e.g. central) location in the person's field of view. The solid line arrow in the lower portion shows the movement path of the transflective mirror.

With respect to specific components, FIG. 2 shows augmented reality eyewear comprising: an eyewear frame 201 which is worn by a person; a display (e.g. a plurality of light-emitting elements which display an image) 202 on the eyewear frame; a transflective mirror (e.g. partly-reflective and partly-transmissive optical component) 203, and a moving arm 205 to which the transflective mirror is attached (or of which the mirror is a part), wherein the transflective mirror has a first configuration in a first location, wherein the transflective mirror has a second configuration in a second location, wherein the second location is closer to the center of the person's field of view than the first location, wherein the transflective mirror is moved by moving the arm, and wherein light 204 from the display is reflected by the transflective mirror to display a virtual object in the person's field of view when the transflective mirror is in the second configuration.

In an example, the eyewear can be eyeglasses. In an example, the eyewear can be a head mounted display. FIG. 2 shows a display and a transflective mirror on the left side of the eyewear. In an example, there can be symmetric components on the right side of eyewear, even though they are not explicitly shown in this figure. In this example, a display is on a sidepiece (e.g. temple) of the eyewear. In this example, light from the display is directed toward the inner (e.g. eye-facing) side of a transflective mirror and then reflected back toward the person's eye. In another example, a display can be on the front piece of eyewear. In another example, light from a display can first be directed toward the outer (e.g. away-from-eye-facing) side of a first transflective mirror and then reflected from a second transflective mirror back toward the person's eye.

In an example, a transflective mirror can be a partial mirror. In an example, a transflective mirror can be a half mirror. In an example, a transflective mirror can function as a beam combiner. In an example, a transflective mirror can combine light rays from the environment (which are incident at a first vector) with light rays from a display (which are incident at a second vector). Both of these light rays can be combined into light rays which exit the mirror toward the person's eye. In an example, a transflective mirror can combine light rays from the environment which are incident on the outward-facing (e.g. away from eye) side of the mirror with light rays which are incident on the inward-facing (e.g. toward the eye) side of the mirror. In another example, a transflective mirror can combine light rays from the environment which are incident on the outward-facing (e.g. away from eye) side of the mirror with light rays which are (initially) also incident on the outward-facing (e.g. away from eye) side of the mirror.

In this example, there is a single transflective mirror (on one side of the eyewear) which reflects light from the display directly toward a person's eye. In another example, there can be two transflective mirrors (on one side of the eyewear): a first one which reflects light from the display away from the eye; and a second one which reflects this light back toward the eye. In an example, there can be two transflective mirrors: an inner mirror which reflects light from the display away from the eye; and an outer mirror which reflects this light back toward the eye. In another example, there can be two transflective mirrors: a flat inner mirror which reflects light from the display away from the eye; and a curved outer mirror which reflects this light back toward the eye. When there are two transflective mirrors, one or both of the mirrors can be moved as the device is changed from a first configuration to a second configuration.

In this example, a transflective mirror is attached to (or part of) a movable arm. The mirror is changed from its first configuration to its second configuration by moving the arm. In an example, the arm can be movably attached to an eyewear frame or lens. In an example, the arm can be slid along a track or channel on the eyewear frame or lens. In an example, the arm can be pivoted or rotated around a movable joint (e.g. axle) on the eyewear frame or lens. In an example, an arm can be telescopically-extended or telescopically-retracted. In an example, am arm can be articulated. In an example, an arm can be moved manually. In an example, an arm can be moved automatically by an electrical actuator. In an example, an arm can be transparent.

In this example, a transflective mirror is moved along a substantially-horizontal path from its first configuration (in the periphery of a person's field of view) to its second configuration (in the center of the person's field of view). In another example, a transflective mirror can be moved along a substantially-vertical path from its first configuration (in the periphery of a person's field of view) to its second configuration (in the center of the person's field of view). In this example, a transflective mirror can be moved along a diagonal (between horizontal and vertical) path from its first configuration (in the periphery of a person's field of view) to its second configuration (in the center of the person's field of view). In an example, a transflective mirror can be moved from an upper-outer quadrant or a lower-outer quadrant of a lens (or a person's field) of view to the center of the lens (or the person's field of view).

In an example, eyewear can further comprise a tracking and/or scanning mechanism which tracks a change in the location of a transflective mirror and adjusts the direction of light rays from the display so that these light rays continue to be reflected by the transflective mirror toward the person's eye to display a virtual object in their field of view. In an example, this eyewear can further comprise a scanning mirror and/or digital micromirror array which changes the direction of light rays from the display when the transflective mirror moves so that these light rays continue to be reflected by the transflective mirror toward the person's eye to display a virtual object in their field of view. Example variations discussed elsewhere in this disclosure or priority-linked disclosures can also be applied to the example shown in this figure where relevant.

FIG. 3 shows an example of adjustable-mode augmented reality (AR) eyewear with a movable transflective mirror. This design enables a person to select: an environmental viewing mode which provides the person with an excellent (e.g. clear, undistorted, wide-angle) view of the environment; or an augmented reality viewing mode in which a virtual object is prominently (e.g. centrally) displayed in the person's view of the environment. The upper portion of FIG. 3 shows this eyewear in the environmental viewing mode, wherein the transflective mirror is (substantially) retracted out of the person's field of view. The lower portion of FIG. 3 shows this eyewear in augmented reality viewing mode, wherein the transflective mirror extended into the person's field of view. The solid line arrow in the lower portion shows the movement path of the transflective mirror.

With respect to specific components, FIG. 3 shows augmented reality eyewear comprising: an eyewear frame 301 which is worn by a person; a display (e.g. a plurality of light-emitting elements which display an image) 302 on the eyewear frame; and a transflective mirror (e.g. partly-reflective and partly-transmissive optical component) 303, wherein the transflective mirror has a first configuration which is retracted into the eyewear frame, wherein the transflective mirror has a second configuration which extends out from the eyewear frame into the person's field of view, wherein the transflective mirror is moved from its first configuration to its second configuration, and wherein light 304 from the display is reflected by the transflective mirror to display a virtual object in the person's field of view when the transflective mirror is in the second configuration.

In an example, the eyewear can be eyeglasses. In an example, the eyewear can be a head mounted display. FIG. 3 shows a display and a transflective mirror on the left side of the eyewear. In an example, there can be symmetric components on the right side of eyewear, even though they are not explicitly shown in this figure. In this example, a display is on a sidepiece (e.g. temple) of the eyewear. In this example, light from the display is first directed toward the inner (e.g. eye-facing) side of a transflective mirror and then reflected back toward the person's eye. In another example, a display can be on the front piece of eyewear. In another example, light from a display can be first directed toward the outer (e.g. away-from-eye-facing) side of a first transflective mirror and then reflected back from a second transflective mirror toward the person's eye.

In an example, a transflective mirror can be a partial mirror. In an example, a transflective mirror can be a half mirror. In an example, a transflective mirror can function as a beam combiner. In an example, a transflective mirror can combine light rays from the environment (which are incident at a first vector) with light rays from a display (which are incident at a second vector). Both of these light rays can be combined into light rays which exit the mirror toward the person's eye. In an example, a transflective mirror can combine light rays from the environment which are incident on the outward-facing (e.g. away from eye) side of the mirror with light rays which are incident on the inward-facing (e.g. toward the eye) side of the mirror. In another example, a transflective mirror can combine light rays from the environment which are incident on the outward-facing (e.g. away from eye) side of the mirror with light rays which are (initially) also incident on the outward-facing (e.g. away from eye) side of the mirror.

In this example, there is a single transflective mirror (on one side of the eyewear) which reflects light from the display directly toward a person's eye. In another example, there can be two transflective mirrors (on one side of the eyewear): a first one which reflects light from the display away from the eye; and a second one which reflects this light back toward the eye. In an example, there can be two transflective mirrors: an inner mirror which reflects light from the display away from the eye; and an outer mirror which reflects this light back toward the eye. In another example, there can be two transflective mirrors: a flat inner mirror which reflects light from the display away from the eye; and a curved outer mirror which reflects this light back toward the eye. When there are two transflective mirrors, one or both of the mirrors can be moved as the device is changed from a first configuration to a second configuration.

In this example, the transflective mirror is retracted into a recess or compartment in an eyewear frame above a lens and/or a person's eye in the first configuration. In this example, the transflective mirror is extended out from the recess or compartment and in front of the lens and/or the person's eye in the second configuration. In an example, a transflective mirror can moved from its first configuration to its second configuration by being slid out from a recess or compartment in an eyewear frame. In an example, a transflective mirror can moved from its first configuration to its second configuration by being slid out from a location which overlaps a section of an eyewear frame.

In an example, a transflective mirror can moved from its first configuration to its second configuration by being pivoted or rotated out from a recess or compartment in an eyewear frame. In an example, a transflective mirror can moved from its first configuration to its second configuration by being pivoted or rotated out from a location which overlaps a section of an eyewear frame. In an example, a transflective mirror can moved from its first configuration to its second configuration by being unfolded out from a recess or compartment in an eyewear frame. In an example, a transflective mirror can moved from its first configuration to its second configuration by being unfolded out from a location which overlaps a section of an eyewear frame.

In an example, a transflective mirror can moved from its first configuration to its second configuration by being unrolled and/or un-scrolled out from a recess or compartment in an eyewear frame. In an example, a transflective mirror can moved from its first configuration to its second configuration by being unrolled and/or un-scrolled out from a location which overlaps a section of an eyewear frame. In an example, a transflective mirror can moved from its first configuration to its second configuration by being telescopically-extended out from a recess or compartment in an eyewear frame. In an example, a transflective mirror can moved from its first configuration to its second configuration by being telescopically-extended out from a location which overlaps a section of an eyewear frame.

In an example, eyewear can further comprise a tracking and/or scanning mechanism which tracks a change in the location of a transflective mirror and adjusts the direction of light rays from the display so that these light rays continue to be reflected by the transflective mirror toward the person's eye to display a virtual object in their field of view. In an example, this eyewear can further comprise a scanning mirror and/or digital micromirror array which changes the direction of light rays from the display when the transflective mirror moves so that these light rays continue to be reflected by the transflective mirror toward the person's eye to display a virtual object in their field of view. Example variations discussed elsewhere in this disclosure or priority-linked disclosures can also be applied to the example shown in this figure where relevant.

Figure 4:
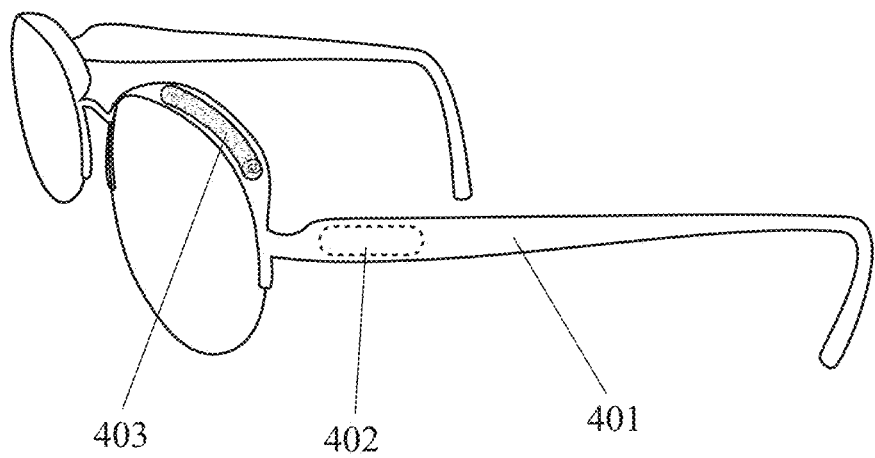
FIG. 4 shows an example of augmented reality eyewear with a transflective mirror which can be rolled up into the eyewear frame or unrolled out from the frame into a person's field of view.
Figure 4:
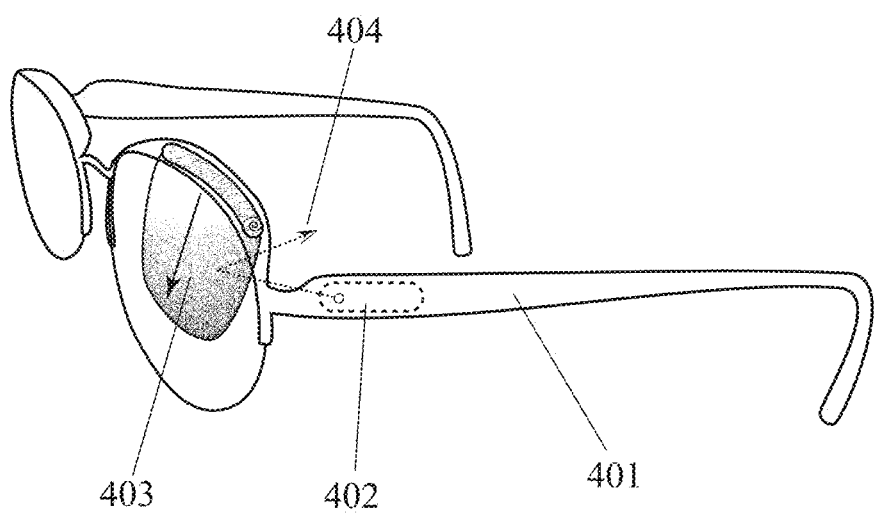

FIG. 4 shows an example of adjustable-mode augmented reality (AR) eyewear with a movable transflective mirror. This design enables a person to select: an environmental viewing mode which provides the person with an excellent (e.g. clear, undistorted, wide-angle) view of the environment; or an augmented reality viewing mode in which a virtual object is prominently (e.g. centrally) displayed in the person's view of the environment. The upper portion of FIG. 4 shows this eyewear in the environmental viewing mode, wherein the transflective mirror is (substantially) retracted out of the person's field of view. The lower portion of FIG. 4 shows this eyewear in augmented reality viewing mode, wherein the transflective mirror extended into the person's field of view. The solid line arrow in the lower portion shows the movement path of the transflective mirror.

With respect to specific components, FIG. 4 shows augmented reality eyewear comprising: an eyewear frame 401 which is worn by a person; a display (e.g. a plurality of light-emitting elements which display an image) 402 on the eyewear frame; and a transflective mirror (e.g. partly-reflective and partly-transmissive optical component) 403, wherein the transflective mirror has a first configuration which is rolled up and retracted into the eyewear frame, wherein the transflective mirror has a second configuration which is unrolled and extended out from the eyewear frame into the person's field of view, wherein the transflective mirror is moved from its first configuration to its second configuration, and wherein light 404 from the display is reflected by the transflective mirror to display a virtual object in the person's field of view when the transflective mirror is in the second configuration.

In an example, the eyewear can be eyeglasses. In an example, the eyewear can be a head mounted display. FIG. 4 shows a display and a transflective mirror on the left side of the eyewear. In an example, there can be symmetric components on the right side of eyewear, even though they are not explicitly shown in this figure. In this example, a display is on a sidepiece (e.g. temple) of the eyewear. In this example, light from the display is first directed toward the inner (e.g. eye-facing) side of a transflective mirror and then reflected back toward the person's eye. In another example, a display can be on the front piece of eyewear. In another example, light from a display can be first directed toward the outer (e.g. away-from-eye-facing) side of a first transflective mirror and then reflected back from a second transflective mirror toward the person's eye.

In an example, a transflective mirror can be a partial mirror. In an example, a transflective mirror can be a half mirror. In an example, a transflective mirror can function as a beam combiner. In an example, a transflective mirror can combine light rays from the environment (which are incident at a first vector) with light rays from a display (which are incident at a second vector). Both of these light rays can be combined into light rays which exit the mirror toward the person's eye. In an example, a transflective mirror can combine light rays from the environment which are incident on the outward-facing (e.g. away from eye) side of the mirror with light rays which are incident on the inward-facing (e.g. toward the eye) side of the mirror. In another example, a transflective mirror can combine light rays from the environment which are incident on the outward-facing (e.g. away from eye) side of the mirror with light rays which are (initially) also incident on the outward-facing (e.g. away from eye) side of the mirror.

In this example, there is a single transflective mirror (on one side of the eyewear) which reflects light from the display directly toward a person's eye. In another example, there can be two transflective mirrors (on one side of the eyewear): a first one which reflects light from the display away from the eye; and a second one which reflects this light back toward the eye. In an example, there can be two transflective mirrors: an inner mirror which reflects light from the display away from the eye; and an outer mirror which reflects this light back toward the eye. In another example, there can be two transflective mirrors: a flat inner mirror which reflects light from the display away from the eye; and a curved outer mirror which reflects this light back toward the eye. When there are two transflective mirrors, one or both of the mirrors can be moved as the device is changed from a first configuration to a second configuration.

In this example, the transflective mirror is rolled up and retracted into a recess or compartment in an eyewear frame above a lens and/or a person's eye in the first configuration. In this example, the transflective mirror is unrolled and extended out from the recess or compartment and in front of the lens and/or the person's eye in the second configuration. In another example, a transflective mirror can moved from its first configuration to its second configuration by being slid out from a recess or compartment in an eyewear frame. In another example, a transflective mirror can moved from its first configuration to its second configuration by being slid out from a location which overlaps a section of an eyewear frame.

In an example, a transflective mirror can moved from its first configuration to its second configuration by being pivoted or rotated out from a recess or compartment in an eyewear frame. In an example, a transflective mirror can moved from its first configuration to its second configuration by being pivoted or rotated out from a location which overlaps a section of an eyewear frame. In an example, a transflective mirror can moved from its first configuration to its second configuration by being unfolded out from a recess or compartment in an eyewear frame. In an example, a transflective mirror can moved from its first configuration to its second configuration by being unfolded out from a location which overlaps a section of an eyewear frame.

In this example, a transflective mirror is moved from its first configuration to its second configuration by being unrolled and/or un-scrolled out from a recess or compartment in an eyewear frame. In an example, a transflective mirror can moved from its first configuration to its second configuration by being unrolled and/or un-scrolled out from a location which overlaps a section of an eyewear frame. In an example, a transflective mirror can moved from its first configuration to its second configuration by being telescopically-extended out from a recess or compartment in an eyewear frame. In an example, a transflective mirror can moved from its first configuration to its second configuration by being telescopically-extended out from a location which overlaps a section of an eyewear frame.

In an example, eyewear can further comprise a tracking and/or scanning mechanism which tracks a change in the location of a transflective mirror and adjusts the direction of light rays from the display so that these light rays continue to be reflected by the transflective mirror toward the person's eye to display a virtual object in their field of view. In an example, this eyewear can further comprise a scanning mirror and/or digital micromirror array which changes the direction of light rays from the display when the transflective mirror moves so that these light rays continue to be reflected by the transflective mirror toward the person's eye to display a virtual object in their field of view. Example variations discussed elsewhere in this disclosure or priority-linked disclosures can also be applied to the example shown in this figure where relevant.

I claim:

1. Augmented reality eyewear comprising:
an eyewear frame which is configured to be worn by a person;
a display on the eyewear frame; and
a transflective mirror, wherein the transflective mirror partly transmits light and partly reflects light, wherein the transflective mirror has a first configuration in a first location, wherein the transflective mirror has a second configuration in a second location, wherein the second location is closer to the center of the person's field of view than the first location, wherein the transflective mirror is moved from its first configuration to its second configuration, wherein the eyewear is changed from the first configuration to the second configuration by unfolding, unrolling, or telescopically-extending the transflective mirror, and wherein light from the display is reflected by the transflective mirror to display a virtual object in the person's field of view when the transflective mirror is in the second configuration.

2. Augmented reality eyewear comprising:
an eyewear frame which is configured to be worn by a person;
a display on the eyewear frame; and
a transflective mirror, wherein the transflective mirror partly transmits light and partly reflects light, wherein the transflective mirror has a first configuration in a first location, wherein the transflective mirror has a second configuration in a second location, wherein the second location is closer to the center of the person's field of view than the first location, wherein the transflective mirror is moved from its first configuration to its second configuration, wherein there is a recess, opening, or compartment in the eyewear frame, wherein the transflective mirror is retracted into the recess, opening, or compartment in the first configuration and extends out from the recess, opening, or compartment in the second configuration, and wherein light from the display is reflected by the transflective mirror to display a virtual object in the person's field of view when the transflective mirror is in the second configuration.

* * * * *